(12) United States Patent
Oike

(10) Patent No.: US 8,004,587 B2
(45) Date of Patent: Aug. 23, 2011

(54) SOLID-STATE IMAGING DEVICE, SIGNAL PROCESSING METHOD FOR THE SAME, AND IMAGING APPARATUS

(75) Inventor: Yusuke Oike, Kanagawa (JP)

(73) Assignee: Sony Corporation, Tokyo (JP)

( * ) Notice: Subject to any disclaimer, the term of this patent is extended or adjusted under 35 U.S.C. 154(b) by 699 days.

(21) Appl. No.: 12/107,233

(22) Filed: Apr. 22, 2008

(65) Prior Publication Data

US 2008/0259177 A1    Oct. 23, 2008

(30) Foreign Application Priority Data

Apr. 23, 2007 (JP) ................. 2007-112650

(51) Int. Cl.
- H04N 5/217 (2011.01)
- H04N 5/228 (2006.01)
- H04N 3/14 (2006.01)
- H04N 5/335 (2011.01)

(52) U.S. Cl. .......... 348/241; 348/308; 348/222.1; 348/301; 348/302

(58) Field of Classification Search .......... 348/222.1, 348/241, 294–310
See application file for complete search history.

(56) References Cited

U.S. PATENT DOCUMENTS

| | | | |
|---|---|---|---|
| 6,850,278 B1* | 2/2005 | Sakurai et al. | 348/302 |
| 7,554,577 B2* | 6/2009 | Yokohata et al. | 348/222.1 |
| 7,576,780 B2* | 8/2009 | Kondo et al. | 348/220.1 |
| 7,589,774 B2* | 9/2009 | Kaifu et al. | 348/308 |
| 7,701,494 B2* | 4/2010 | Shibasaki | 348/241 |
| 7,821,539 B2* | 10/2010 | Motoki | 348/207.99 |
| 2006/0066741 A1* | 3/2006 | Koizumi et al. | 348/308 |
| 2006/0222218 A1* | 10/2006 | Karaki | 382/124 |
| 2007/0046797 A1* | 3/2007 | Kakumoto | 348/294 |

FOREIGN PATENT DOCUMENTS

JP    2001-177775    6/2001

* cited by examiner

Primary Examiner — Timothy J Henn
Assistant Examiner — Pritham Prabhakher
(74) Attorney, Agent, or Firm — SNR Denton US LLP

(57) ABSTRACT

Disclosed herein is a solid-state imaging device, including, a pixel array unit, driving means, signal processing means, level determining means and control means.

17 Claims, 32 Drawing Sheets

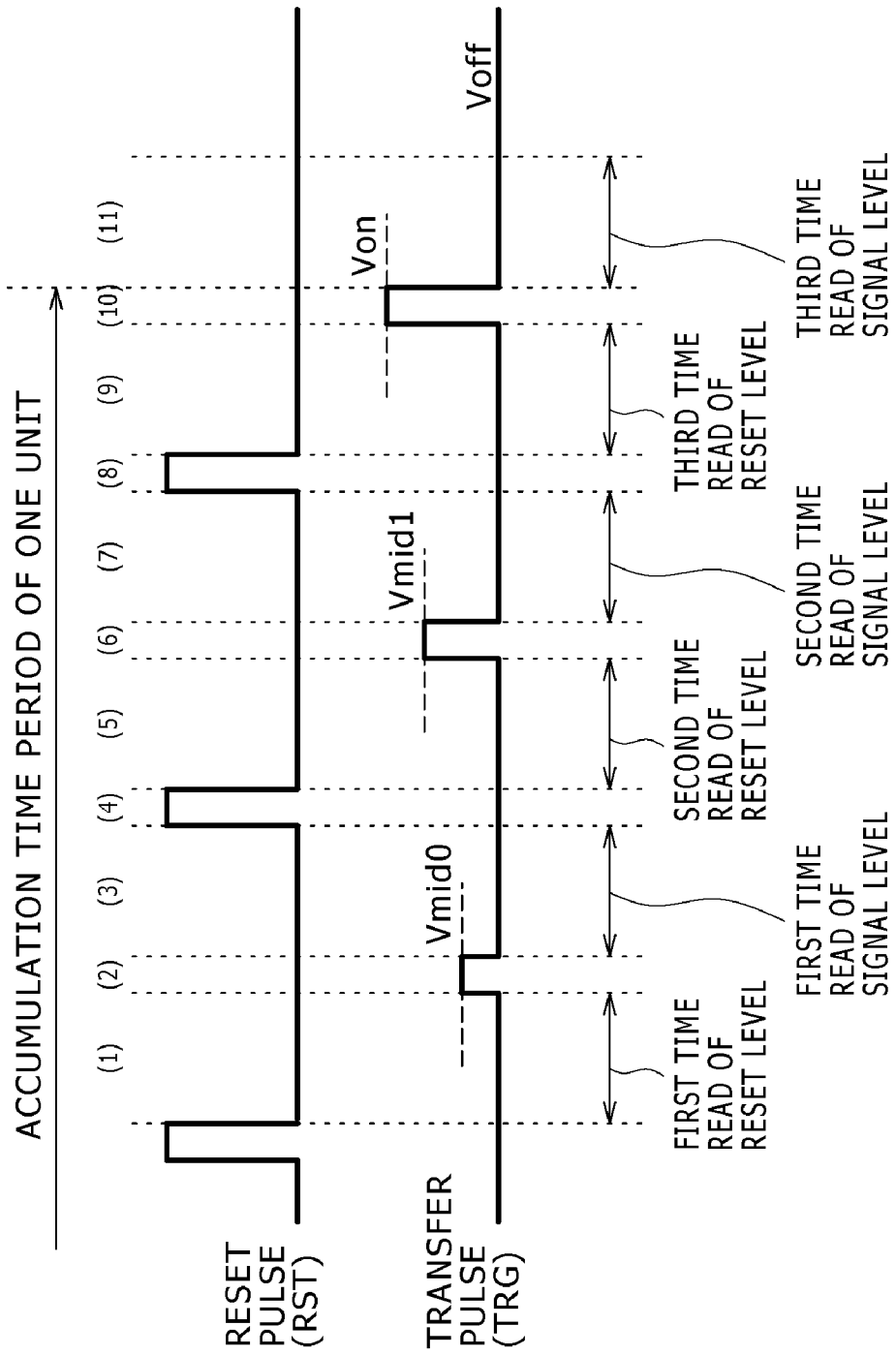

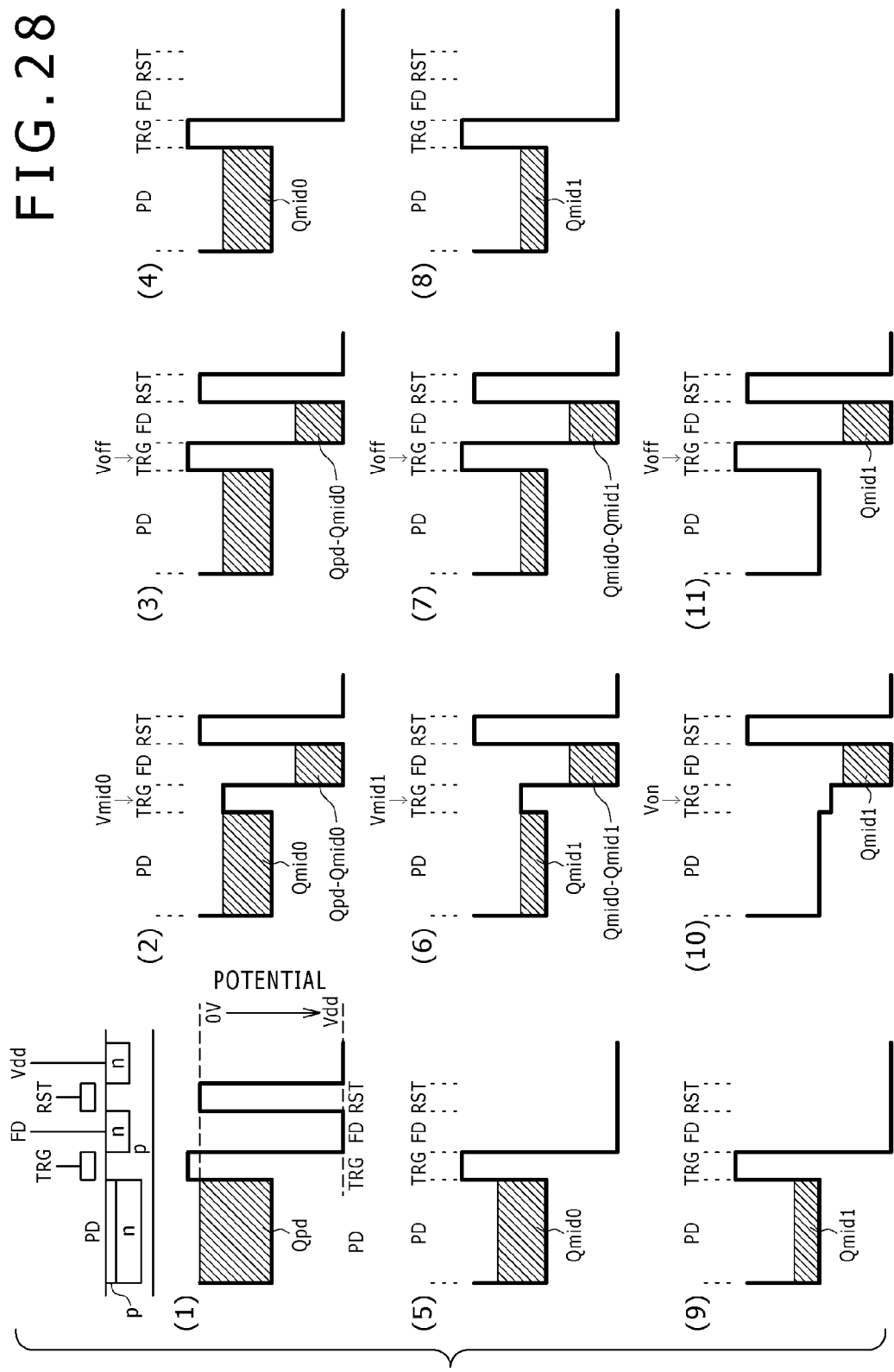

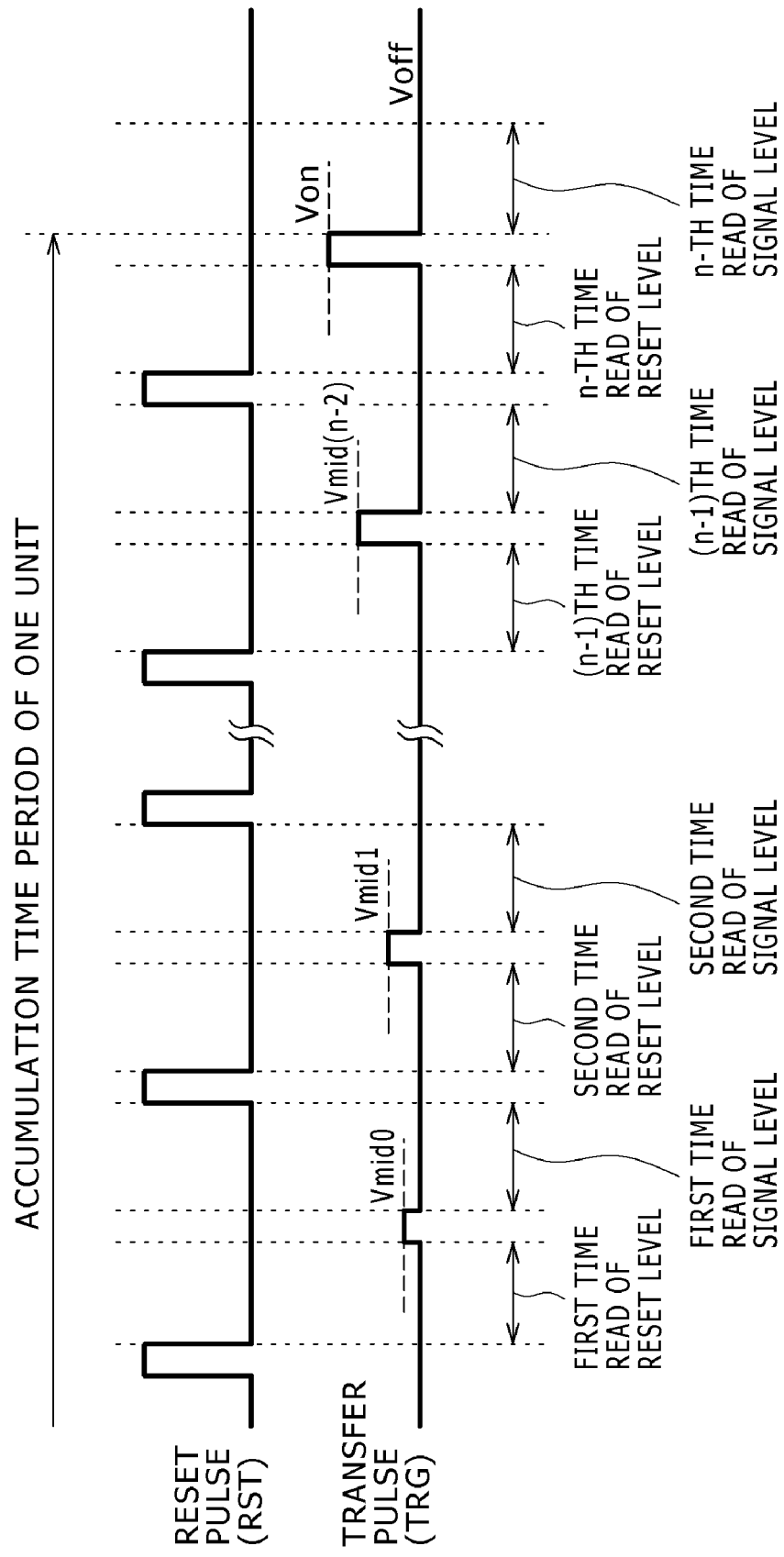

SOLID-STATE IMAGING DEVICE, SIGNAL PROCESSING METHOD FOR THE SAME, AND IMAGING APPARATUS

CROSS REFERENCES TO RELATED APPLICATIONS

The present invention contains subject matter related to Japanese Patent Application JP 2007-112650 filed in the Japan Patent Office on Apr. 23, 2007, the entire contents of which being incorporated herein by reference.

BACKGROUND OF THE INVENTION

1. Field of the Invention

The present invention relates to a solid-state imaging device, a signal processing method for the same, and an imaging apparatus.

2. Description of the Related Art

FIG. 36 shows an example of a configuration of a unit pixel 100 of a solid-state imaging device. As with this example, in the unit pixel 100 having a transfer transistor for transferring signal charges obtained through photoelectric conversion in a photoelectric conversion element 101, a maximum quantity, Qfd.max, of charges accumulated which can be transferred to a floating diffusion capacitor (FD) 106 of the unit pixel is made sufficiently larger than a maximum quantity, Qpd.max, of charges accumulated in the photoelectric conversion element 101 as a light receiving unit. As a result, the perfect transfer of the signal charges from the photoelectric conversion element 101 to the floating diffusion capacitor 106 is realized by removing the residual charges in the photoelectric conversion element 101.

The perfect transfer is realized for the signal charges obtained through the photoelectric conversion in the photoelectric conversion element 101 in the manner as described above, which results in that a residual image in a phase of photographing of an image can be prevented and a satisfactory linearity between a luminance of an incident light and a sensor output signal can be realized. In this connection, the unit pixel 100 of this embodiment includes a reset transistor 103, an amplification transistor 104 and a pixel selecting transistor 105 in addition to the transfer transistor 102.

However, the unit pixel 100 shown in FIG. 36 involves the following problems.

(1) Since the maximum quantity, Qfd.max, of charges accumulated must be larger than the maximum quantity, Qpd.max, of charges accumulated in the photoelectric conversion element 101, there is a limit to reduction of the capacitance of the floating diffusion capacitor 106 for enhancement of a charge-to-voltage conversion efficiency.

(2) Since for the same reason as that of the above, a decrease in power source voltage Vdd used as a reset voltage for the floating diffusion capacitor 106 leads to reduction of the maximum quantity, Qfd.max, of charges accumulated in the floating diffusion capacitor 106, there is a limit to lowering of the power source voltage Vdd.

Then, heretofore, the problems (1) and (2) described above are solved in the following manner. That is to say, when the maximum quantity, Qfd.max, of charges accumulated is less due to the reduction of the capacitance of the floating diffusion capacitor 106 for enhancement of a charge-to-voltage conversion efficiency, or when the maximum quantity, Qfd.max, of charges accumulated is less owing to the lowering of the reset voltage (power source voltage) Vdd, after the charge transfer, the signal reading, and the reset of the floating diffusion capacitor 106 are carried out, the charges which remain in the photoelectric conversion element 101 because they are more than the transfer transistor 102 can transfer are transferred again to read out the signal. As a result, all the charges accumulated in the photoelectric conversion element 101 are read out in plural batches. This technique, for example, is described in the Japanese Patent Laid-Open No. 2001-177775.

SUMMARY OF THE INVENTION

However, in the case where as with the related art described above, the charges are transferred in plural batches and the signal charges thus transferred in plural batches are outputted to be unconditionally added to one another, especially, when the luminance of the incident light is low, random noises and fixed pattern noises are necessarily added, respectively, similarly to the case where the signal level is high although the signal level is low. As a result, the random noises and the fixed pattern noises further increase as compared with the case where the signal charges are read out without being partitioned in plural batches, so that the image quality is deteriorated.

For example, when the random noise in reading out the signal charges by one batch is $N_{RN}$, and the fixed pattern noise in reading out the signal charges by one batch is $N_{FPN}$, the noise obtained by reading out the random noises and the fixed pattern noises in n batches and adding them to one another, respectively, is expressed by a mean square of n-fold of the fixed pattern noise $N_{FPN}$, and $\sqrt{n}$-fold of the random noise $N_{RN}$.

In the light of the foregoing, it is therefore desire to provide a solid-state imaging device which is capable of realizing a high S/N ratio especially in a region having a low luminance of an incident light (low luminance region) with a configuration for transferring all accumulated charges in plural batches when they can not be outputted through one reading-out operation, and outputting signal charges, a signal processing method for the same, and an imaging apparatus.

In order to attain the desire described above, according to an embodiment of the present invention, there is provided a solid-state imaging device, including, a pixel array unit constituted by arranging unit pixels in matrix, each of the unit pixels including a photoelectric conversion unit configured to convert an optical signal into signal charges, a transfer element configured to transfer the signal charges obtained through photoelectric conversion in the photoelectric conversion unit, and output means configured to output the signal charges transferred by the transfer element, driving means configured to read out the signal charges accumulated in the photoelectric conversion unit for an accumulation period of time of one unit and transferred at least in two batches by the transfer element through the output means, signal processing means configured to execute addition processing for a plurality of output signals read out on a partition basis from the unit pixel, level determining means configured to compare each of signal levels of the plurality of output signals with a reference level, and control means configured to instruct the signal processing means to execute the addition processing for the output signals, having the signal levels each being equal to or higher than the reference level, of the plurality of output signals in accordance with a determination result obtained from the level determining means.

According to another embodiment of the present invention, there is provided a signal processing method for a solid-state imaging device including, a pixel array unit constituted by arranging unit pixels in matrix, each of the unit pixels including a photoelectric conversion unit configured to convert an optical signal into signal charges, a transfer element configured to transfer the signal charges obtained through photoelectric conversion in the photoelectric conversion unit, and an output section configured to output the signal charges transferred by the transfer element, driving means configured to read out the signal charges accumulated in the photoelectric conversion unit for an accumulation period of time of one unit and transferred at least in two batches by the transfer element through the output section, the solid-state imaging device executing addition processing for a plurality of output signals read out on a partition basis from the unit pixel, the signal processing method including the steps of, comparing each of the signal levels of the plurality of output signals with a reference level, and executing the addition processing for the output signals, having the signal levels each being equal or higher than the reference level, of the plurality of output signals in accordance with a comparison result.

According to yet another embodiment of the present invention, there is provided an imaging apparatus, including, a solid-state imaging device constituted by arranging unit pixels in matrix, each of the unit pixels including a photoelectric conversion unit configured to convert an optical signal into signal charges, a transfer element configured to transfer the signal charges obtained through photoelectric conversion in the photoelectric conversion unit, and output means configured to output the signal charges transferred by the transfer element, and an optical system configured to focus an incident light onto an imaging area of the solid-state imaging device, wherein the solid-state imaging device includes, driving means configured to read out the signal charges accumulated in the photoelectric conversion unit for an accumulation period of time of one unit and transferred at least in two batches by the transfer element through the output means, signal processing means configured to execute addition processing for a plurality of output signals read out on a partition basis from the unit pixel, level determining means configured to compare each of signal levels of the plurality of output signals with a reference level, and control means configured to instruct the signal processing means to execute the addition processing for the output signals, having the signal levels each being equal to or higher than the reference level, of the plurality of output signals in accordance with a determination result obtained from the level determining means.

According to an embodiment of the present invention, in the case where the accumulated charges which can not be outputted in one reading-out operation are transferred in plural batches, when the luminance of the incident light is low, the fixed pattern noises and the random noises are prevented from being summed up, respectively, which results in that the high S/N ratio can be realized especially on the low luminance side. Consequently, the image quality of the captured image can be enhanced.

BRIEF DESCRIPTION OF THE DRAWINGS

FIG. 27 is a timing chart showing a driving timing example in the case of tri-partition transfer;

FIG. 28 is an energy diagram explaining an operation in the case of the tri-partition transfer;

FIG. 29 is a timing chart showing a driving timing example in the case of n-partition transfer;

DETAILED DESCRIPTION OF THE PREFERRED EMBODIMENTS

Preferred embodiments of the present invention will be described in detail hereinafter with reference to the accompanying drawings.

First Embodiment

Figure 1:
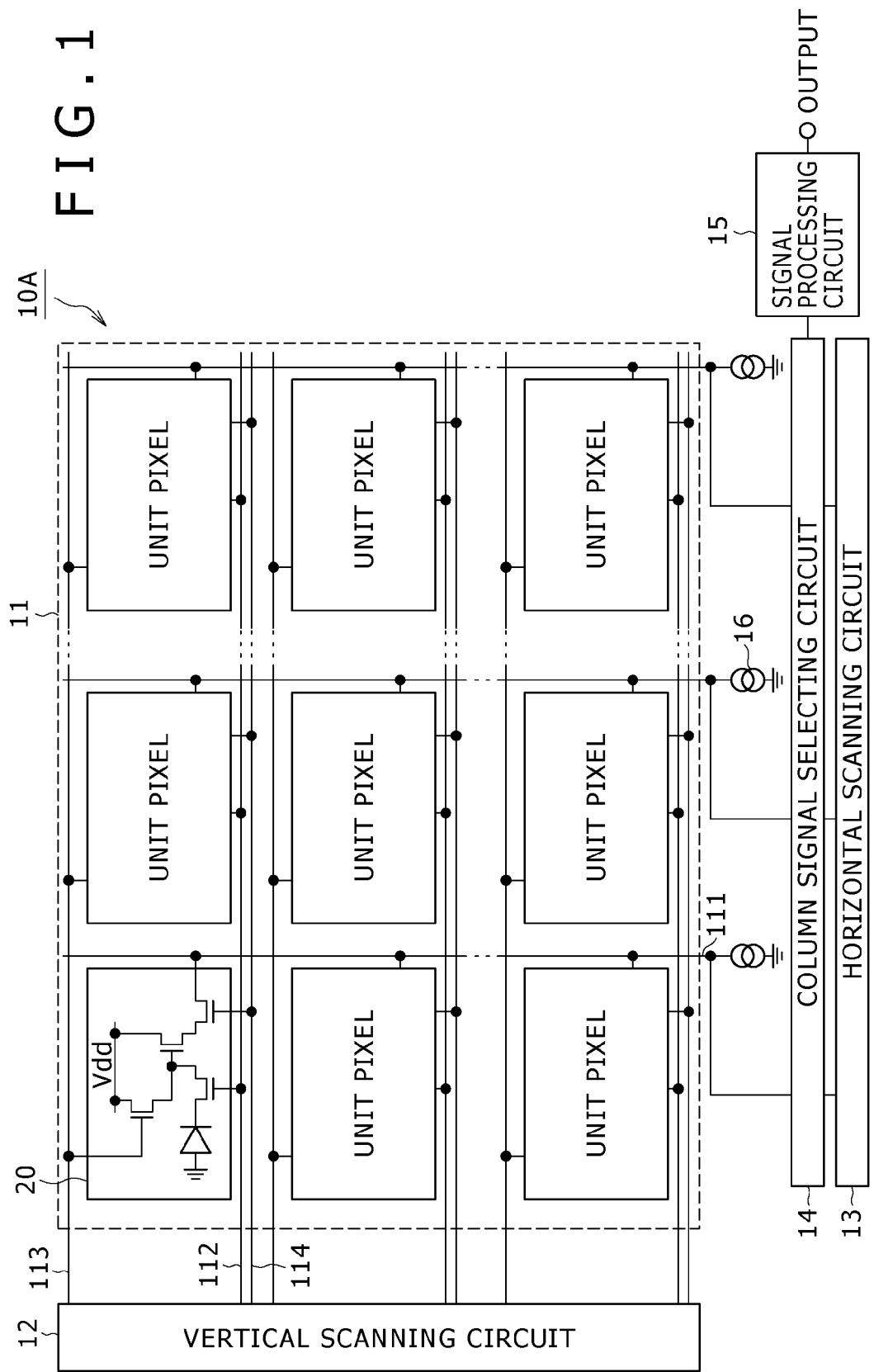
FIG. 1 is a system configuration diagram showing a CMOS image sensor according to a first embodiment of the present invention.

FIG. 1 is a system configuration diagram showing a configuration of a solid-state imaging device, for example, a CMOS image sensor according to a first embodiment of the present invention.

As shown in FIG. 1, a CMOS image sensor 10A of this embodiment includes a pixel array unit 11, and its peripheral circuit. In this case, the pixel array unit 11 is configured such that units pixels each including a photoelectric conversion element (hereinafter simply referred to as "a pixel" in some cases) 20 are two-dimensionally arranged in matrix. A vertical scanning circuit 12, a horizontal scanning circuit 13, a column signal selecting circuit 14, a signal processing circuit 15, and the like, for example, are provided as the peripheral circuit of the pixel array unit 11.

For the matrix arrangement of the pixels 20 in the pixel array unit 11, a vertical signal line 111 is wired every pixel column, and driving control lines, for example, a transfer control line 112, a reset control line 113, and a selection control line 114 are wired every pixel row.

Constant current sources 16 are connected to one ends of the vertical signal lines 111, respectively. A transistor for current bias a gate of which, for example, is biased by a bias voltage Vbias may be used instead of using the constant current source 16. In this case, the transistor for current bias configures, together with an amplification transistor 24 which will be described later, a source follower circuit (refer to FIG. 2).

The vertical scanning circuit 12 is constituted by a shift register, an address decoder or the like. In addition, while vertically scanning the pixels 20 of the pixel array unit 11 in units of rows with respect to each of the electronic shutter rows and the read-out rows, the vertical scanning circuit 12 carries out an electronic shutter operation for sweeping off the signals from corresponding ones of the pixels 20 belonging to the electronic shutter row, and carries out a reading-out operation for reading out the signals from corresponding ones of the pixels belonging to the read-out row.

Although an illustration is omitted here, the vertical scanning circuit 12 includes a reading-out scanning system, and an electronic shutter scanning system. In this case, the reading-out scanning system carries out the reading-out operation for reading out the signals from the pixels 20 belonging to the read-out row while successively selecting the pixels 20 in units of the rows. Also, the electronic shutter scanning system carries out the electronic shutter operation for the same row (electronic shutter row) before the reading-out scanning by the reading-out scanning system by a period of time corresponding to a shutter speed.

Also, a period of time ranging from a first timing to a second timing becomes an accumulation period of time (exposure period of time) of one unit for the signal charges in each of the pixels 20. Here, at the first timing, the unnecessary charges in the photoelectric conversion unit are reset through the shutter scanning by the electronic shutter scanning system. Also, at the second timing, the signals are read out from the pixels, respectively, through the reading-out scanning by the reading-out scanning system. That is to say, the electronic shutter operation means an operation for resetting (sweeping off) the signal charges accumulated in the photoelectric conversion unit, and starting to newly accumulate the signal charges after completion of the reset of the signal charges.

The horizontal scanning circuit 13 is constituted by a shift register, an address decoder or the like. The horizontal scanning circuit 13 horizontally scans the pixel columns of the pixel array unit 11 in order. The column signal selecting circuit 14 is composed of a horizontal selecting switch, a horizontal signal line, and the like. The column signal selecting circuit 14 successively outputs the signals of the respective pixels 20 which are outputted from the pixel array unit 11 through the vertical signal lines 111 in correspondence to the pixel rows, respectively, synchronously with the horizontal scanning operation made by the horizontal scanning circuit 13.

The signal processing circuit 15 executes various signal processing such as noise removing processing, analog-to-digital (A/D) conversion processing, and addition processing for the signals of the pixel 20 which are outputted in units of pixels from the column signal selecting circuit 14. This embodiment features a configuration and an operation of the signal processing circuit 15. The details of the feature of this embodiment will be described later.

It is noted that a timing signal and a control signal each of which becomes a reference for operations of the vertical scanning circuit 12, the horizontal scanning circuit 13, the signal processing circuit 15, and the like are generated from a timing controlling circuit (not shown).

(Pixel Circuit)

Figure 2:
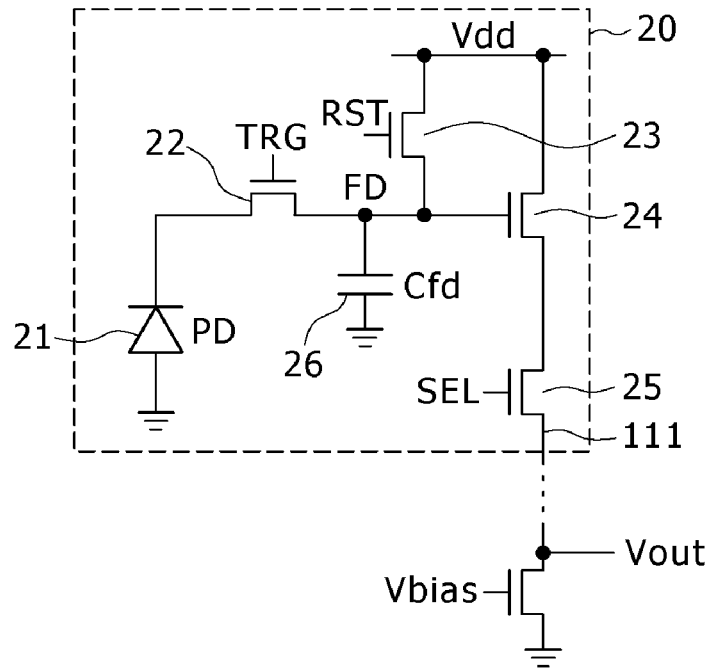
FIG. 2 is a circuit diagram showing an example of a circuit configuration of a unit pixel shown in FIG. 1.

FIG. 2 is a circuit diagram showing an example of a circuit configuration of the unit pixel 20. The unit pixel 20 of this example is configured as a pixel circuit including four transistors, for example, a transfer transistor (transfer element) 22, a reset transistor 23, an amplification transistor 24, and a selection transistor 25 in addition to a photoelectric conversion element (photoelectric conversion unit) 21 such as a buried photodiode. In this case, although N-channel MOS transistors, for example, are used as the four transistors 22 to 25, the present invention is by no means limited to this configuration.

The transfer transistor 22 is connected between a cathode electrode of the photoelectric conversion element 21 and the floating diffusion capacitor (FD) 26. The transfer transistor 22 transfers signal charges (electrons in this case) which have been accumulated through the photoelectric conversion in the photoelectric conversion element 21 to the floating diffusion capacitor 26 by supplying a transfer pulse TRG to its gate electrode (control electrode). Thus, the floating diffusion capacitor 26 serves as a charge-to-voltage conversion unit for converting the signal charges into a voltage signal.

A drain electrode of the reset transistor 23 is connected to a pixel power source for supplying a power source voltage Vdd, and a source electrode thereof is connected to one end of the floating diffusion capacitor 26 opposite to a grounding end thereof. Prior to the transfer of the signal charges from the photoelectric conversion element 21 to the floating diffusion capacitor 26, the reset transistor 23 resets a potential of the floating diffusion capacitor 26 to a reset voltage Vrst in accordance with a reset pulse RST supplied to its gate electrode.

A gate electrode of the amplification transistor 24 is connected to the one end of the floating diffusion capacitor 26, and a drain electrode thereof is connected to the pixel power source for supplying the power source voltage Vdd. The amplification transistor 24 outputs the potential of the floating diffusion capacitor 26, after being reset by the reset transistor 23, in the form of a signal having a reset level, and outputs a potential of the floating diffusion capacitor 26, after the signal charges are transferred to the floating diffusion capacitor 26 by the transfer transistor 22, in the form of a signal having a signal level.

For example, a drain electrode of the selection transistor 25 is connected to a source electrode of the amplification transistor 24, and a source electrode thereof is connected to the vertical signal line 111. The selection transistor 25 is turned ON in accordance with a selection pulse SEL applied to its gate electrode to set the pixel 20 in a selection state, thereby outputting a signal outputted from the amplification transistor 24 to the vertical signal line 111. The selection transistor 25 can also adopt a configuration of being connected between the pixel power source (Vdd) and the drain electrode of the amplification transistor 24.

Note that, although the case where the embodiment of the present invention is applied to the CMOS image sensor including the unit pixel 20 having the four-transistor configuration including the transfer transistor 22, the reset transistor 23, the amplification transistor 24, and the selection transistor 25 has been given here as an example, the present invention is by no means limited to this application example.

Figure 3:
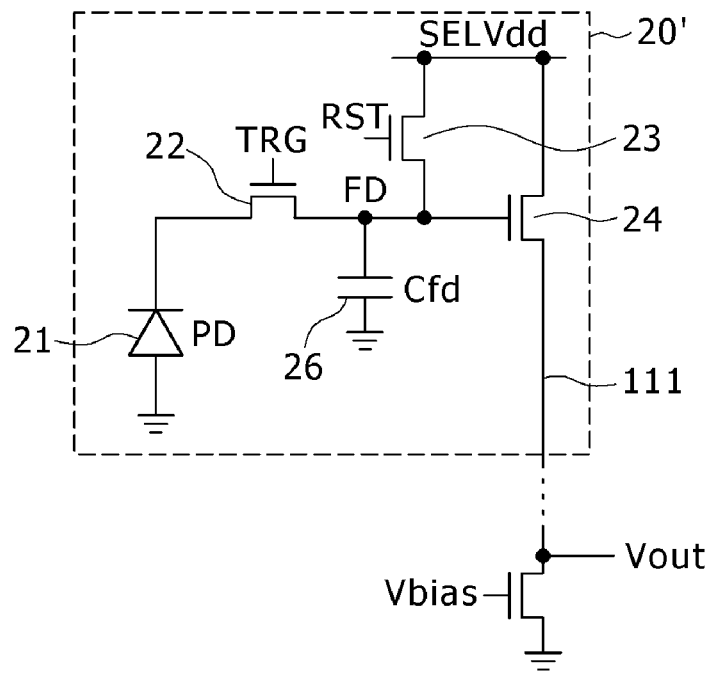
FIG. 3 is a circuit diagram showing another example of the circuit configuration of the unit pixel shown in FIG. 1.
Figure 4:
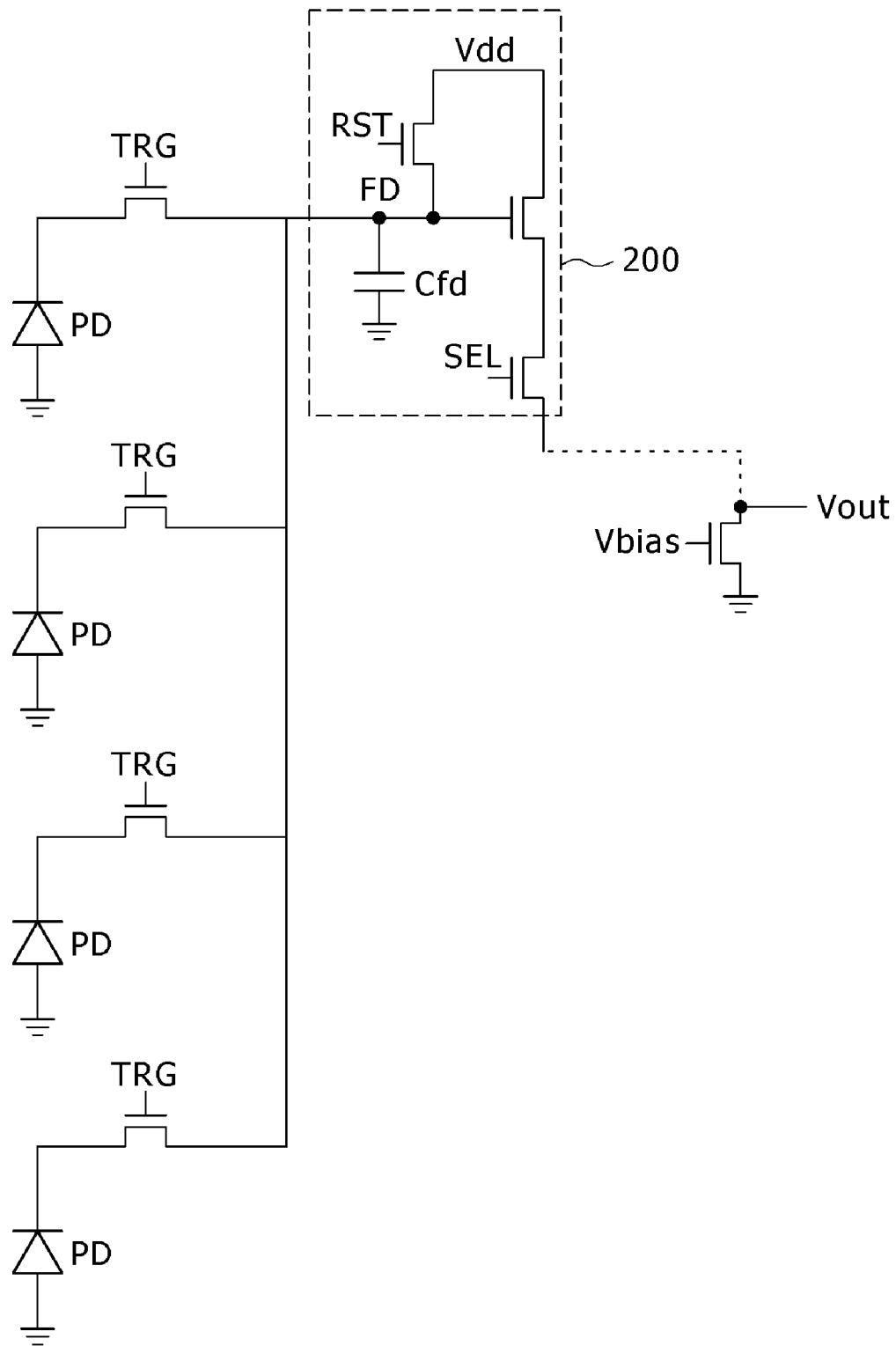
FIG. 4 is a circuit diagram showing still another example of the circuit configuration of the unit pixel shown in FIG. 1.

Specifically, the present invention can also be applied to a CMOS image sensor including a unit pixel 20' having a three-transistor configuration in which as shown in FIG. 3, the selection transistor 25 shown in FIG. 2 is omitted, and a power source voltage SELVdd is made variable, thereby giving the amplification transistor 24 the function of the selection transistor 25, a CMOS image sensor having a configuration in which as shown in FIG. 4, a floating diffusion capacitor FD and a reading-out circuit 200 are shared among a plurality of pixels, or the like.

In the CMOS image sensor 10A having the configuration described above, the vertical scanning circuit 12 for driving the constituent elements (the transfer transistor 22, the reset transistor 23, and the selection transistor 25) of the unit pixel 20 constitutes a driving section. In this case, the signal charges accumulated in the photoelectric conversion element 21 for an accumulation period of time of one unit are partitioned at least in two batches by the transfer transistor 22. Thus, the driving section reads out the signal charges on the partition transfer basis to the vertical signal line 111 through an output section (composed of the reset transistor 23, the floating diffusion capacitor 26, the amplification transistor 24, and the selection transistor 25).

(Partition Transfer)

The CMOS image sensor 10A having the configuration described above carries out an operation for transferring the signal charges accumulated in the photoelectric conversion element 21 for the accumulation period of time of one unit at least in two batches to the floating diffusion capacitor 26 (on the partition transfer basis), and reading out the voltage signals obtained through the photoelectric conversion in the photoelectric conversion element 21 to the vertical signal line 111 through the amplification transistor 24 in units of the pixel rows under the driving based on the transfer pulse TRG, the reset pulse RST and the selection pulse SEL which are suitably outputted from the vertical scanning circuit 12. Also, a plurality of voltage signals read out from the unit pixel 20 on the partition transfer basis are subjected to the addition processing in the signal processing circuit 15 in a subsequent stage.

Figure 5:
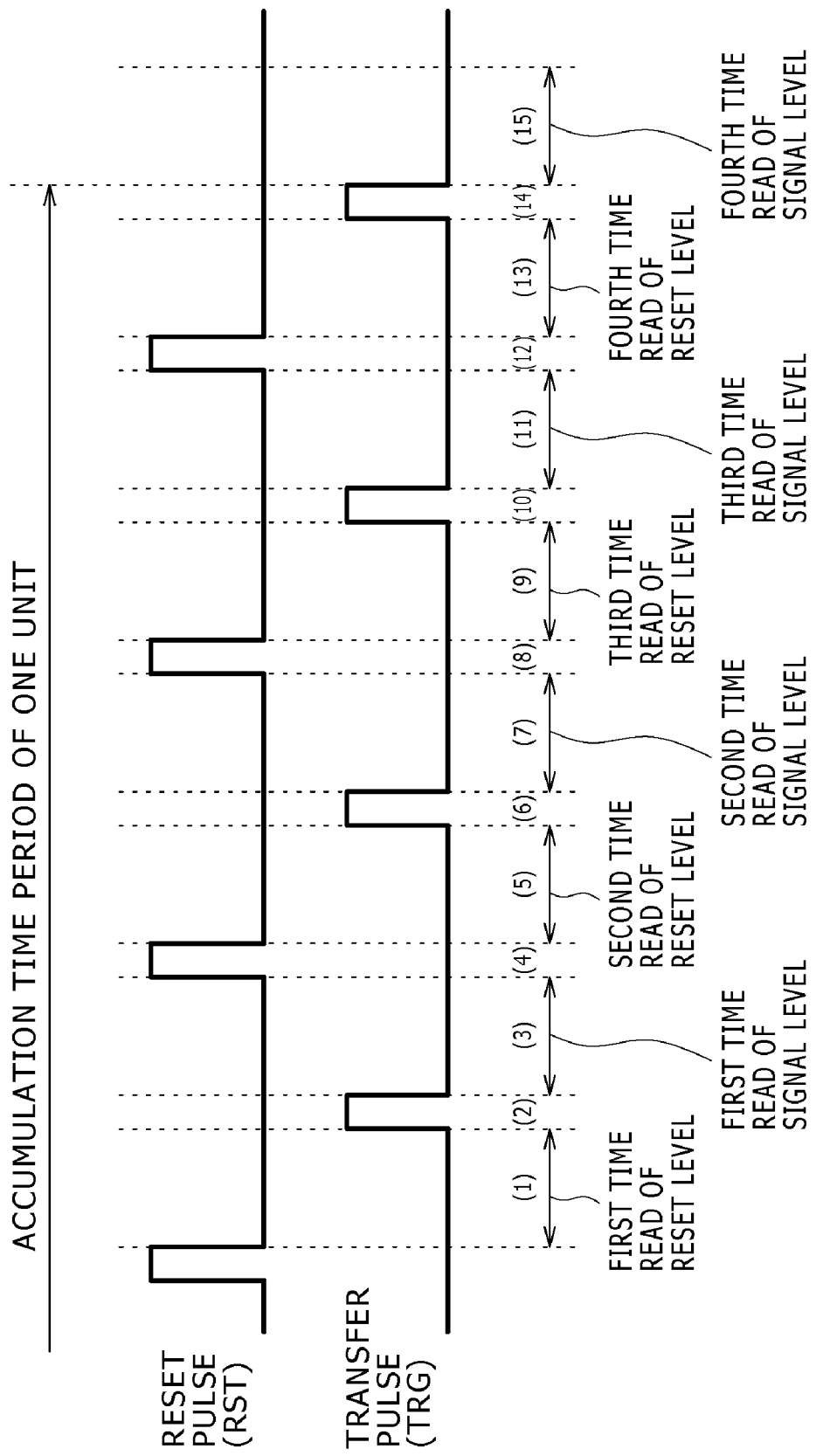
FIG. 5 is a timing chart showing a timing relationship between a reset pulse RST and a transfer pulse TRG when partition transfer is carried out on a quadri-partition basis.
Figure 6:
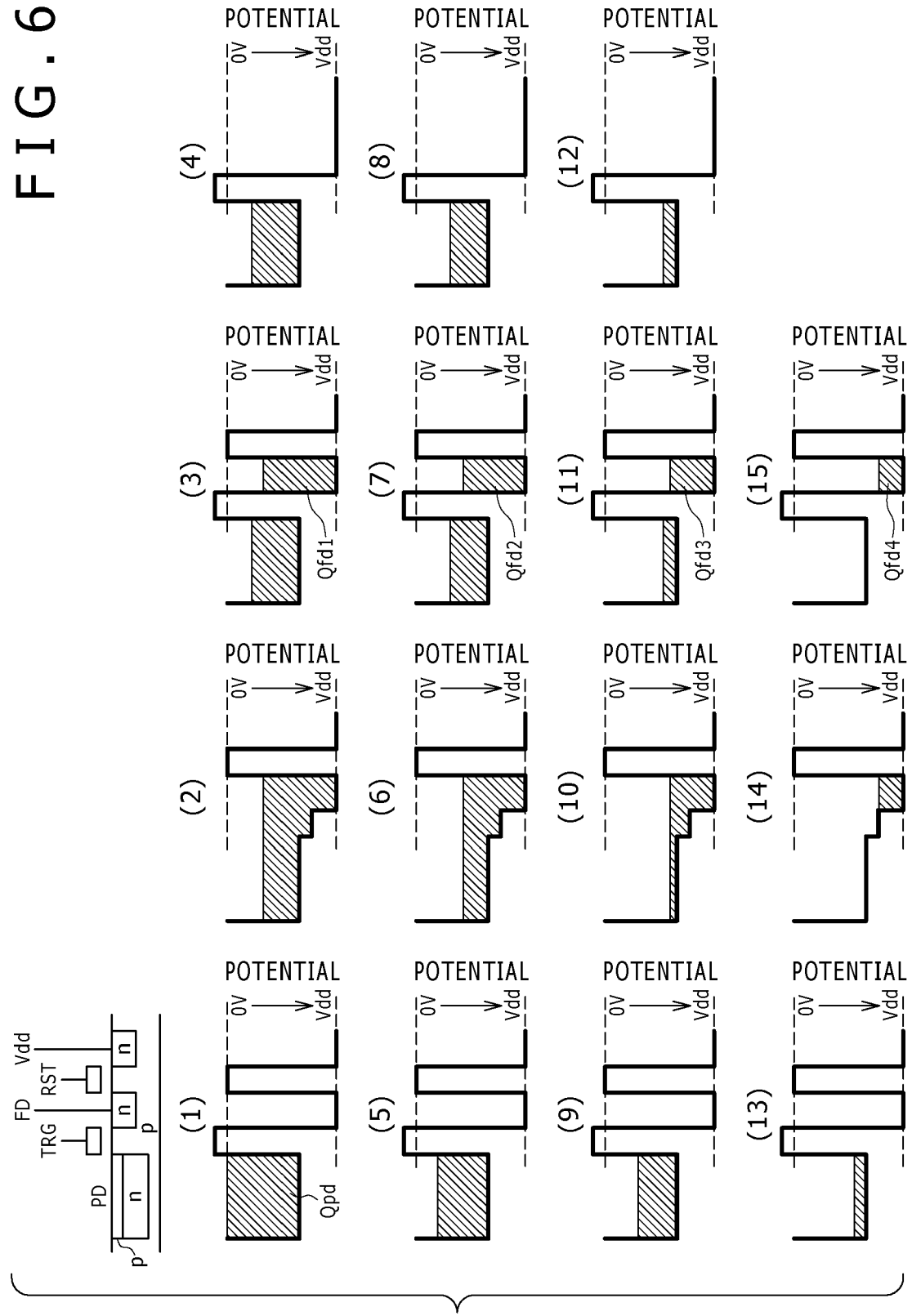
FIG. 6 is an energy diagram explaining an operation when a luminance of an incident light is high in the quadri-partition transfer.
Figure 7:
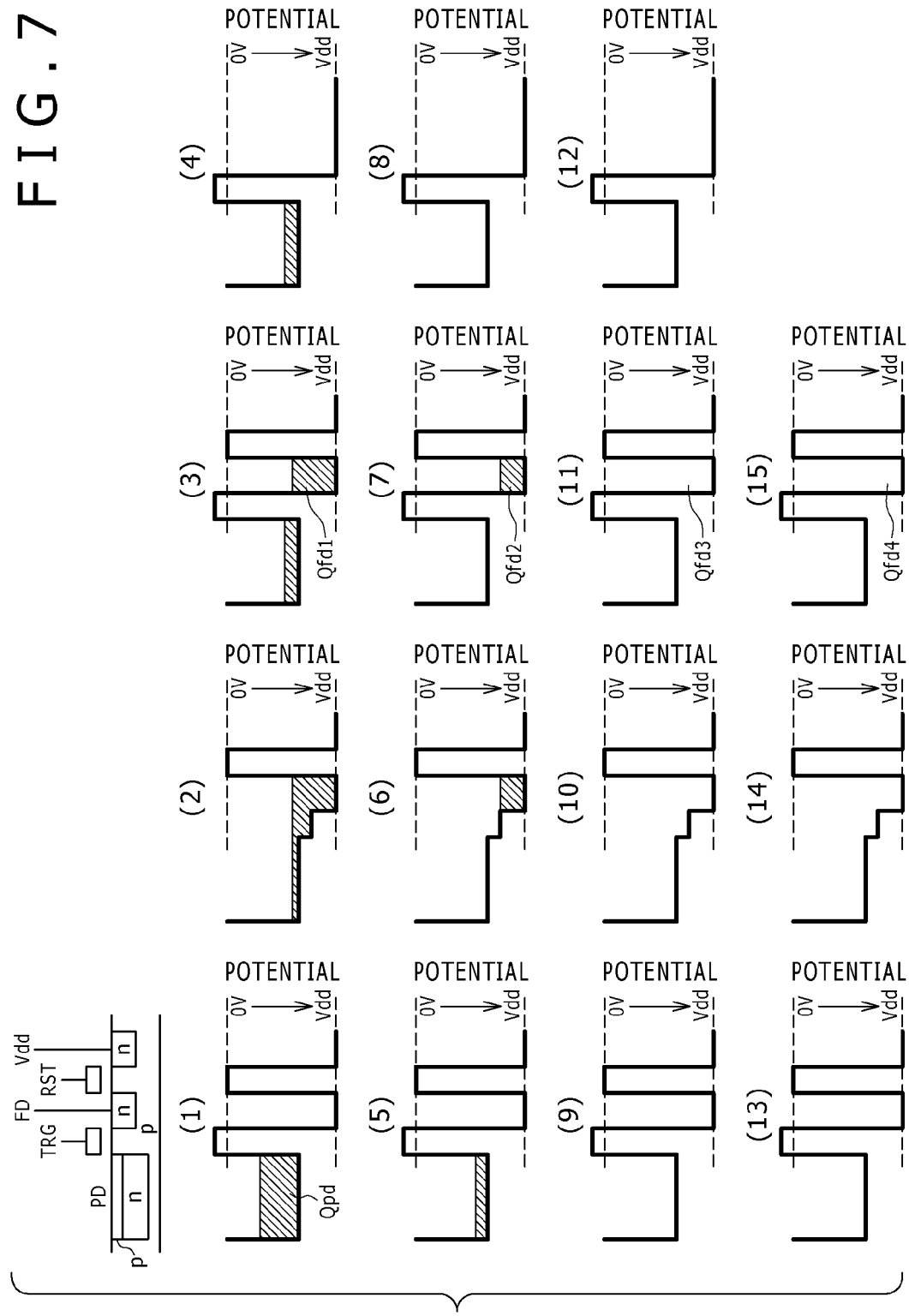
FIG. 7 is an energy diagram explaining an operation when the luminance of the incident light is low in the quadri-partition transfer.

Here, FIG. 5 shows a timing relationship between the reset pulse RST and the transfer pulse TRG when the partition transfer is carried out on a quadri-partition transfer basis as an example. In addition, FIG. 6 shows an energy diagram explaining operations when a luminance of an incident light is high, and FIG. 7 shows an energy diagram explaining operations when the luminance of the incident light is low. In FIGS. 6 and 7, operations (1) to (15) correspond to periods (1) to (15) of time shown in FIG. 5, respectively.

When the signal charges are transferred in four batches, and the charges having the quantity Qfd1, Qfd2, Qfd3, and Qfd4 which are read out in the respective charge transferring operations are added to one another to obtain the accumulated charges having the quantity Qpd (=Qfd1+Qfd2+Qfd3+Qfd4). In addition, in the pixel in which the luminance of the incident light is high and the photoelectric conversion element 21 accumulates therein a large quantity of charges, as shown in FIG. 6, all the accumulated charges having the quantity Qpd can be read out because the quadri-partition and the addition are carried out.

<Problem in Partition Transfer>

On the other hand, in the pixel in which the luminance of the incident light is low and the photoelectric conversion element 21 accumulates therein a small quantity of charges, as shown in FIG. 7, all the accumulated charges are read out in the first several transfer operations (in first two transfer operations) in this example. As a result, there is no signal charge to be outputted for the last several transfer operations (in last two transfer operations) in this example.

As a result, especially, when the luminance of the incident light is low (low luminance), the random noises and the fixed pattern noises are respectively added similarly to the case where the signal level is high although the signal level is low. Thus, the random noises and the fixed pattern noises further increase as compared with the case where the reading-out operation is carried out without the partition, thereby deteriorating the image quantity.

<Feature of this Embodiment>

On the other hand, in the CMOS image sensor 10A of this embodiment, the addition processing or the A/D conversion processing is executed when the signal level is equal to or higher than a reference level. Thus, when there is obtained the output lower than each of maximum values in the individual partition transfer operations, that is, a maximum quantity, Qfd1.max, of charges able to be transferred in the first time transfer operation, a maximum quantity, Qfd2.max, of charges able to be transferred in the second time transfer operation, . . . , it is determined that the reading-out operation for reading out all the accumulated charges having the quantity Qpd is completed. The subsequent addition processing or A/D conversion processing after the partition transfer operation concerned is then stopped. The control is carried out in the manner as described above. This is the feature of the CMOS image sensor 10A of this embodiment.

Figure 8:
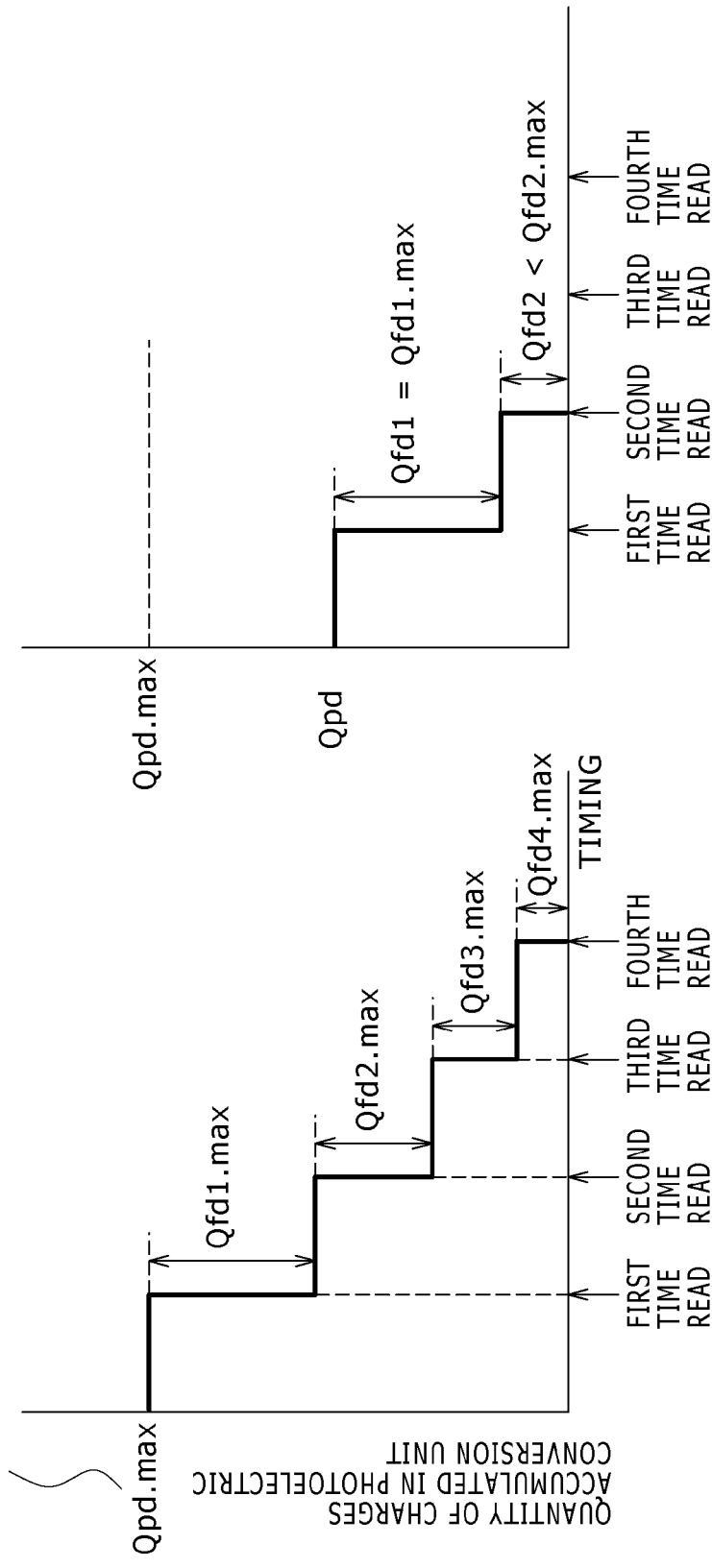
FIGS. 8A and 8B are respectively diagrams each showing a relationship between a maximum quantity, Qpd.max, of charges accumulated which a photoelectric conversion unit can treat, and maximum values Qfd.max in respective partition transfer operations.

The maximum values Qfd.max, as shown in FIG. 8A, become the quantities of charges which are transferred when the maximum values Qfd.max able to be treated by the photoelectric conversion unit (the photoelectric conversion element 21) are transferred on the partition transfer basis.

For example, when Qpd>Qfd1.max, and Qpd<Qfd1.max+ Qfd2.max, as shown in FIG. 8B, the charges having the quantity Qfd1 (=Qfd1.max) are read out in the first time reading-out operation, and the remaining charges having the quantity Qfd2 (=Qpd−QQfd1) are read out in the second time reading-out operation.

A level determining unit which will be described later determines that a relationship of Qfd2<Qfd2.max is established, and the subsequent third time and fourth time addition processing or A/D conversion processing after the second time addition processing or A/D conversion processing are stopped. As a result, the charges having the quantity Qpd obtained by adding the charges having the quantity Qfd1 and the charges having the quantity Qfd2 to each other can be read out, and also it is possible to avoid the addition of the noise components in the third time and fourth time addition processing or A/D conversion processing.

<Effects of the Embodiment>

Figure 9:
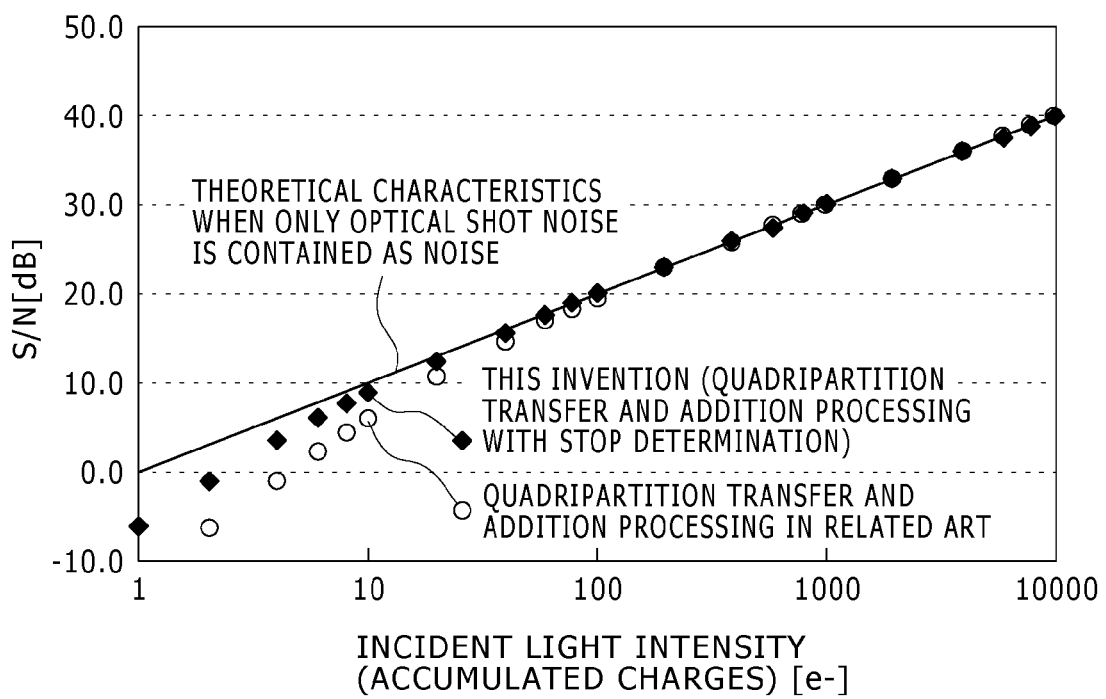
FIG. 9 is a graph showing a relationship between the accumulated charges and an S/N ratio (dB) when the maximum quantity of charges accumulated in the photoelectric conversion unit is set as 10,000 electrons.

FIG. 9 is a graph showing an example of an effect of the CMOS image sensor 10A of this embodiment. That is, FIG. 9 shows a relationship between the accumulated charges and an S/N ratio (dB) when a maximum quantity of charges accumulated in the photoelectric conversion unit is set as 10,000 electrons. It is noted that in general, the quantity of charges accumulated is proportional to the intensity of the incident light until the maximum quantity of charges accumulated is reached.

In this case, the fixed pattern noise in the reading-out operation corresponds to $2e^-$, the random noise in the reading-out operation corresponds to $7e^-$, and the optical shot noise corresponding to the accumulated charges is contained as the noise component. It is generally known that the optical shot noise occurs in the form of the square root of the quantity of charges accumulated. In addition, referring to FIG. 9, the theoretical characteristics when only the optical shot noise is contained as the noise component is shown in the form of a straight line.

In the quadri-partition transfer and the addition processing in the related art, even when the quantity of charges accumulated is less, the fixed pattern noises and the random noises in the reading-out operations are respectively added in correspondence to the number of partitions. As a result, the characteristics are remarkably deteriorated as shown in FIG. 9.

On the other hand, in the CMOS image sensor 10A of this embodiment, when the luminance of the incident light is low, only the addition processing only for the number of times necessary for the reading-out operations is executed. Thus, since an influence of the fixed pattern noises and the random noises in the reading-out operations is small, the high S/N ratio can be realized especially on the low luminance side. Consequently, the image quality can be enhanced accordingly.

Hereinafter, a description will be given with respect to concrete Examples of the signal processing circuit 15 for carrying out the control such that when there is obtained the output lower than each of the maximum quantity, Qfd1.max, of charges able to be transferred in the first time transfer operation, a maximum quantity, Qfd2.max, of charges able to be transferred in the second time transfer operation, . . . , it is determined that the reading-out operation for reading out all the accumulated charges having the quantity Qpd is completed, and the subsequent addition processing or A/D conversion processing after the addition processing or A/D conversion processing concerned is then stopped.

Example 1

Figure 10:
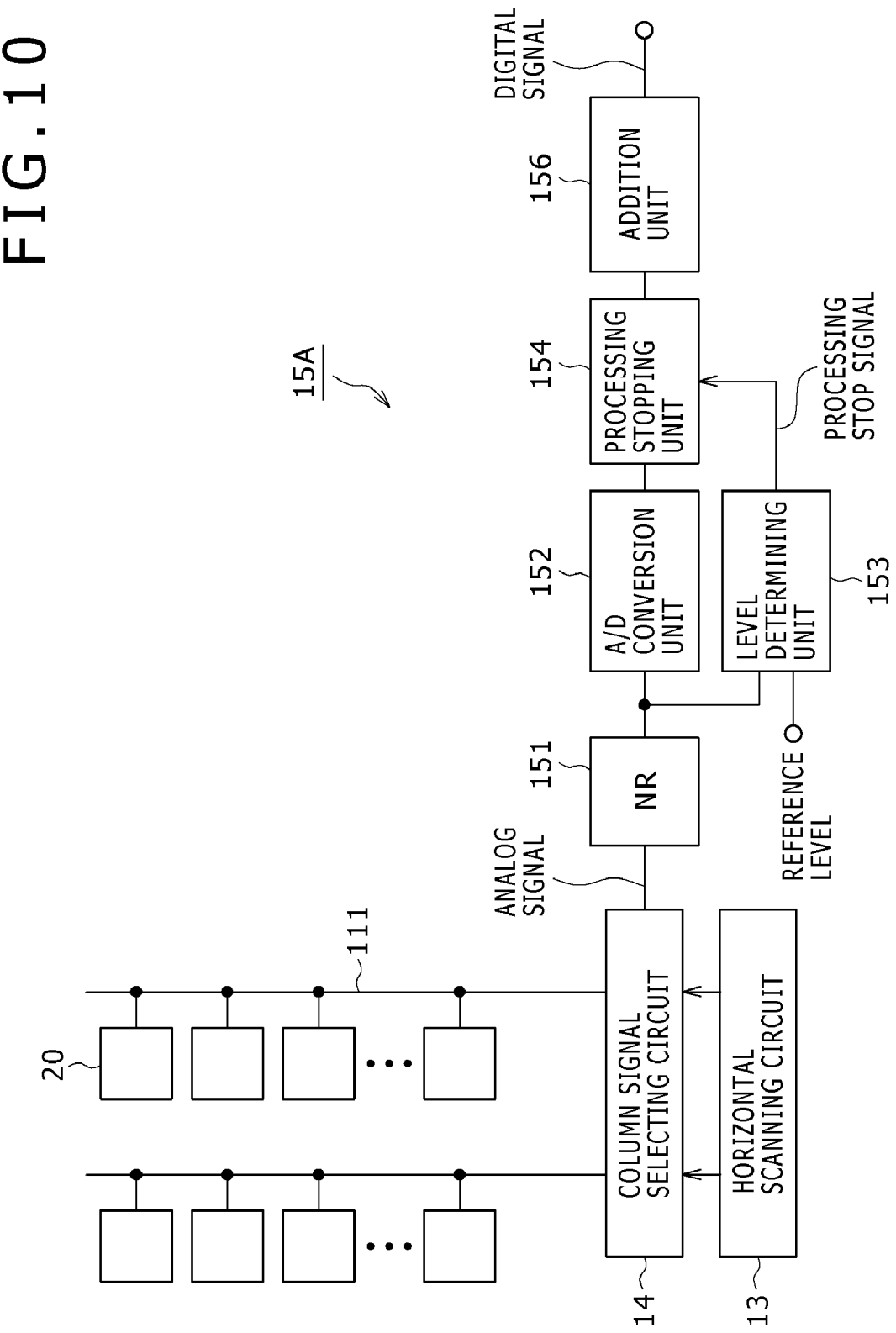
FIG. 10 is a block diagram showing an example of a configuration of a signal processing circuit of Example 1.

FIG. 10 is a block diagram showing an example of a configuration of a signal processing circuit 15A of Example 1. The signal processing circuit 15A of Example 1 includes a noise removing unit 151, an A/D conversion unit 152, a level determining unit 153, a processing stopping unit 154, and an addition unit 156.

The noise removing unit 151, for example, is including a correlated double sampling (CDS) circuit. The noise removing unit 151 successively obtains differences between reset levels and signal levels respective signals of which are successively supplied from the unit pixels 20, thereby removing the reset noises and the fixed pattern noises inherent in each of the pixels owing to a dispersion in thresholds of the amplification transistors 24, or the like.

The analog output signal which is transferred on the partition transfer basis and from which the noises are removed in the noise removing unit 151 is supplied to each of the A/D conversion unit 152 and the level determining unit 153. The A/D conversion unit 152 converts the analog output signal thus supplied thereto into a digital signal through A/D conversion.

The level determining unit 153 compares a level of the analog signal after removal of the noises with a reference level, outputs a determination result when the level of the analog signal is determined to be lower than the reference level, and supplies the determination result in the form of a processing stop signal to the processing stopping unit 154. A concrete configuration of the level determining unit 153 will be described later. The reference level is set so as to correspond to the maximum quantity, Qfd1.max, of charges able to be transferred in the first time transfer operation, the maximum quantity, Qfd2.max, of charges able to be transferred in the second time transfer operation, . . . , respectively.

When the determination result is supplied from the level determining unit 153, the processing stopping unit 154 instructs the addition unit 156 to stop addition processing executed therein for the digital signal outputted from the A/D conversion unit 152 along with the partition transfer basis. A technique for setting the input to the addition unit 156 at zero, a technique for stopping a control signal or a clock for the address unit 156, a technique for stopping the supply of an enable signal in the case of adopting a configuration such that the addition unit 156 executes the addition processing in response to the enable signal, or the like is expected as a technique for stopping the addition processing by the processing stopping unit 154.

When the addition processing is stopped in accordance with the instruction issued from the processing stopping unit 154, the addition unit 156 stops to execute the addition processing (it is assumed that the case of adding zeros is also contained in the concept of stop of the addition processing). However, in any other case other than the above case, the addition unit 156 executes the processing for adding the digital signals which are successively supplied from the A/D conversion unit 152 along with the partition transfer to output the resulting signal in the form of a pixel signal of one pixel.

In the signal processing circuit 15A having the configuration described above, the noise removing unit 151, the A/D conversion unit 152, the LEVEL DETERMINING UNIT 153, the processing stopping unit 154, and the addition unit 156, for example, are integrated with one another on the same semiconductor substrate as that of the pixel array unit 11.

However, there is no necessity for integrating all the noise removing unit 151, the A/D conversion unit 152, the level determining unit 153, the processing stopping unit 154, and the addition unit 156 with one another on the same semiconductor substrate as that of the pixel array unit 11. That is to say, ones of or all of them may be integrated with one another on another semiconductor substrate.

Example 2

Figure 11:
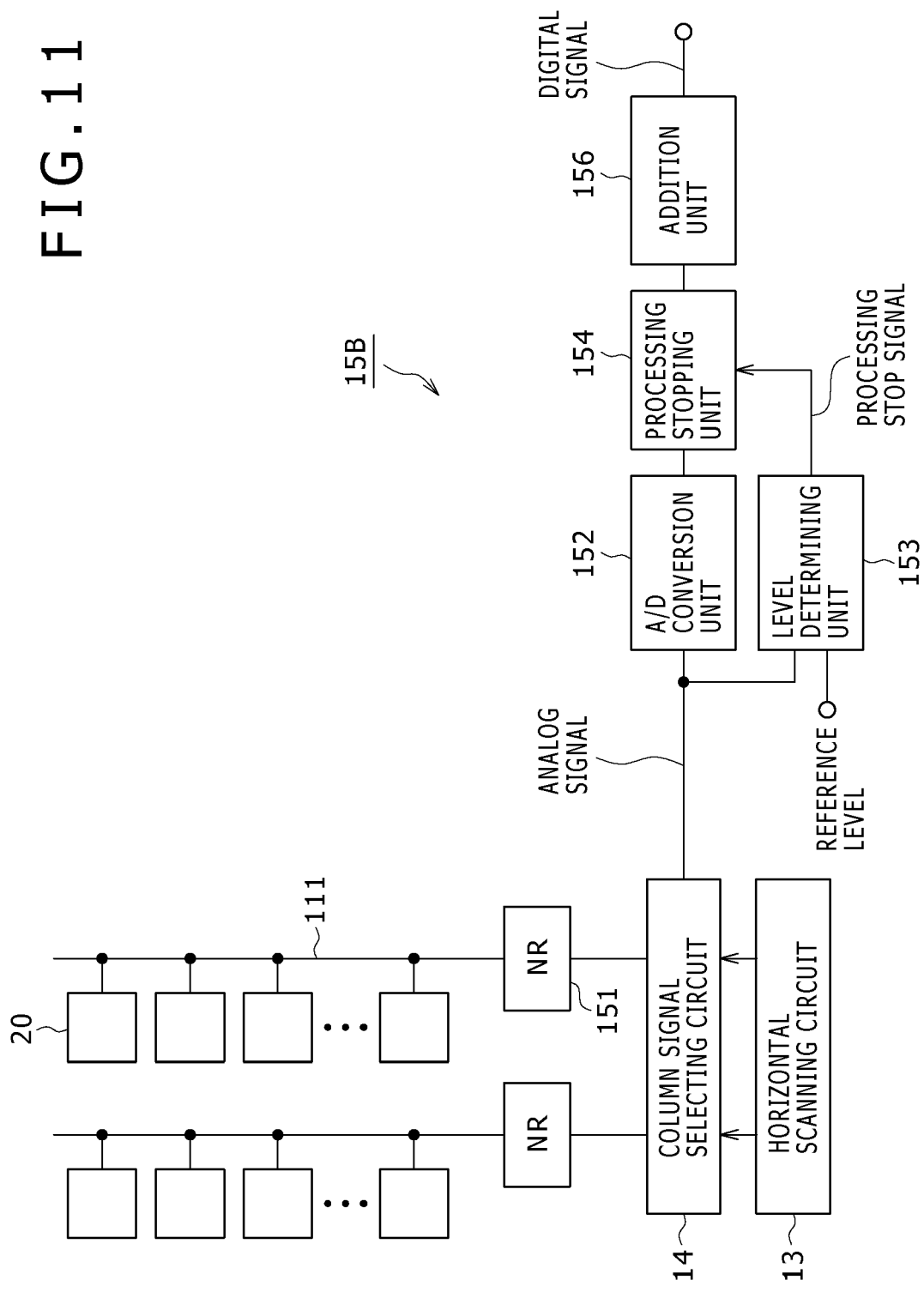
FIG. 11 is a block diagram showing an example of a configuration of a signal processing circuit of Example 2.

FIG. 11 is a block diagram showing an example of a configuration of a signal processing circuit 15B of Example 2. In the figure, units equal to those previously described with reference to FIG. 10 are designated by the same reference numerals, respectively.

The signal processing circuit 15B of Example 2 includes the A/D conversion unit 152, the level determining unit 153, the processing stopping unit 154, and the addition unit 156. Also, for the noise removing unit 151, the signal processing circuit 15B of Example 2 adopts a configuration such that the noise removing units 151 are provided in parallel with one another so as to correspond to the pixel columns of the pixel array unit 11, respectively.

Although in this case, the configuration is adopted such that the noise removing units 151 are provided in parallel with one another so as to correspond to the pixel columns of the pixel array unit 11, respectively, any other suitable configuration may also be adopted. That is to say, a configuration may also be adopted such that ones of or all of the A/D conversion units 152, the level determining units 153, the processing stopping units 154, and the addition units 156 are provided in parallel with one another so as to correspond to the pixel columns of the pixel array unit 11, respectively.

Example 3

Figure 12:
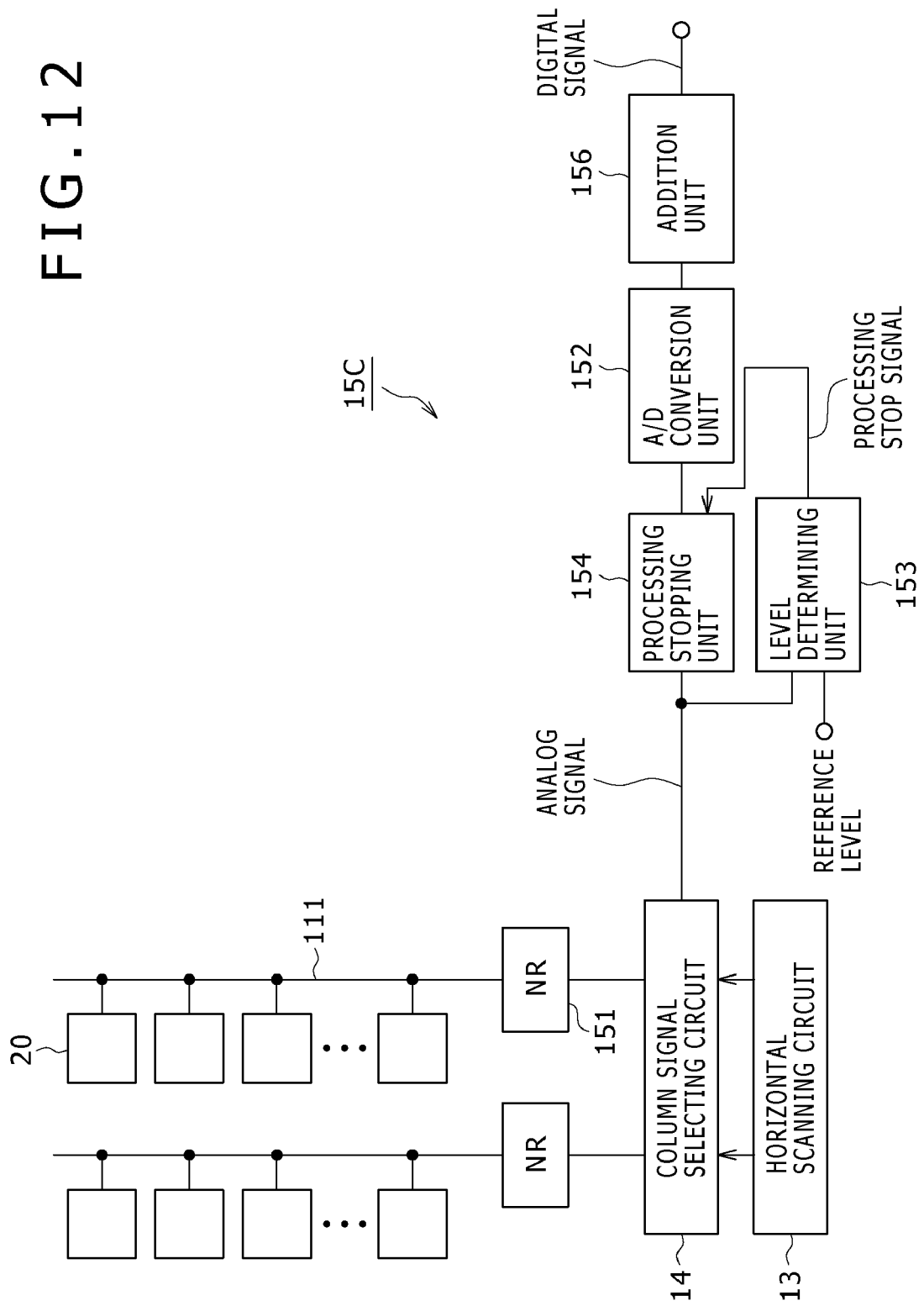
FIG. 12 is a block diagram showing an example of a configuration of a signal processing circuit of Example 3.

FIG. 12 is a block diagram showing an example of a configuration of a signal processing circuit 15C of Example 3. In the figure, units equal to those previously described with reference to FIG. 10 are designated by the same reference numerals, respectively.

The signal processing circuit 15C of Example 3 adopts the following configuration. That is to say, the processing stopping unit 154 is disposed on a side of a preceding stage of the A/D conversion unit 152. Also, when the determination result is supplied in the form of the processing stop signal from the level determining unit 153 to the processing stopping unit 154, the processing stopping unit 154 instructs the A/D conversion unit 152 to stop the A/D conversion processing.

A technique for setting the input to the A/D conversion 152 at zero, a technique for stopping a control signal or a clock for the A/D conversion 152, a technique for stopping the supply of an enable signal in the case of adopting a configuration such that the A/D conversion unit 152 executes the addition processing in response to the enable signal, or the like is expected as a technique for stopping the A/D conversion processing by the processing stopping unit 154.

Note that, it is to be understood that a configuration that the noise removing unit 151 is disposed within the signal processing circuit 15C may be adopted similarly to the case of Example 1.

Example 4

Figure 13:
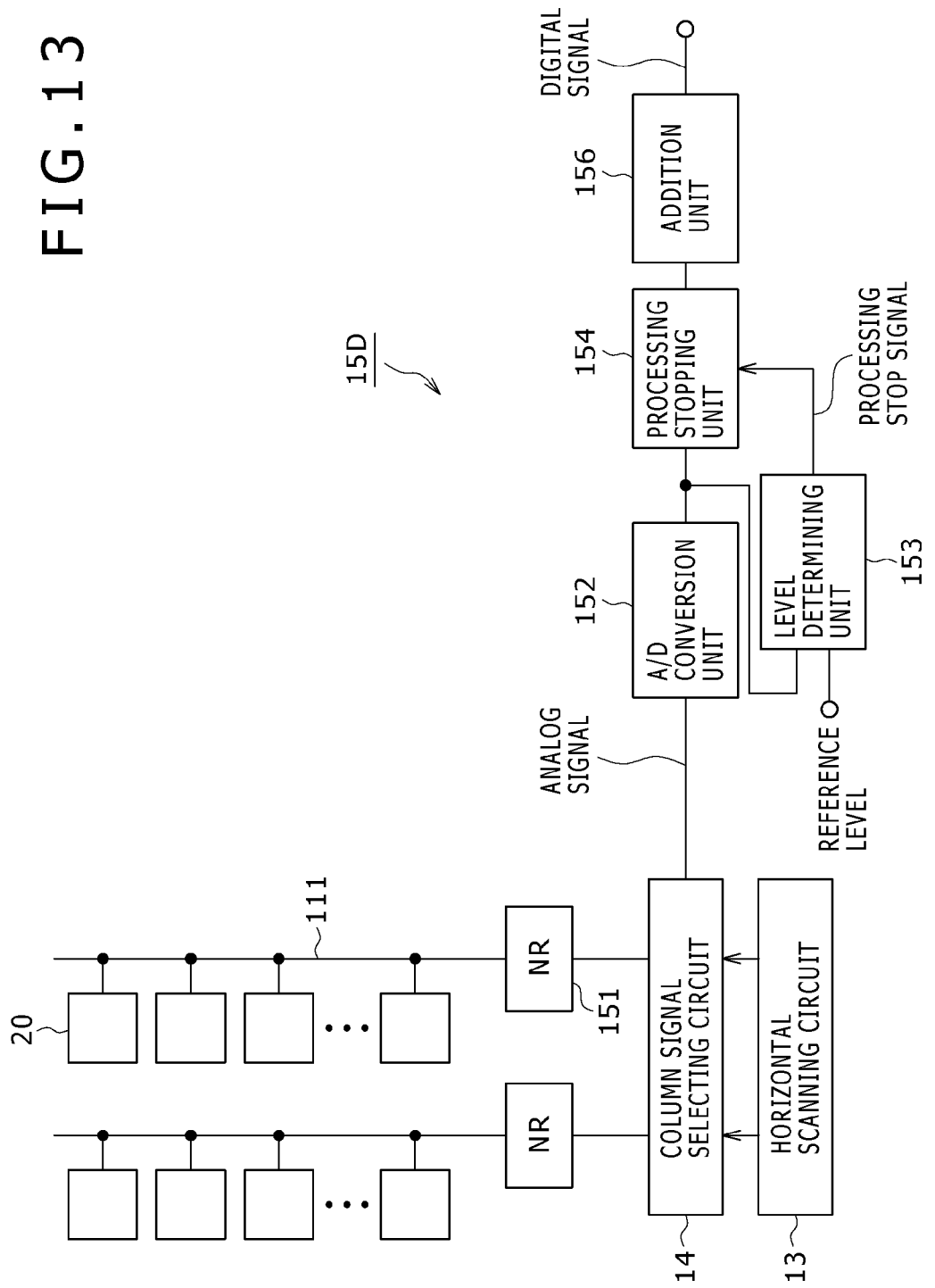
FIG. 13 is a block diagram showing an example of a configuration of a signal processing circuit of Example 4.

FIG. 13 is a block diagram showing an example of a configuration of a signal processing circuit 15D of Example 4. In the figure, units equal to those previously described with reference to FIG. 10 are designated by the same reference numerals, respectively.

The signal processing circuit 15D of Example 4 adopts a configuration such that the level determining unit 153 compares a digital value obtained through the A/D conversion in the A/D conversion unit 152 with the reference level. Also, when the determination result is supplied in the form of the processing stop signal from the level determining unit 153 to the processing stopping unit 154, the processing stopping unit 154 instructs the addition unit 156 to stop the addition processing similarly to the case of Example 1.

A technique for setting the input to the addition unit 156 at zero, a technique for stopping a control signal or a clock for the address unit 156, a technique for stopping the supply of an enable signal in the case of adopting a configuration such that the addition unit 156 executes the addition processing in response to the enable signal, or the like is expected as a technique for stopping the addition processing by the processing stopping unit 154 similarly to the case of Example 1

Note that, it is to be understood that a configuration that the noise removing unit 151 is disposed within the signal processing circuit 15C may be adopted similarly to the case of Example 1.

Example 5

Figure 14:
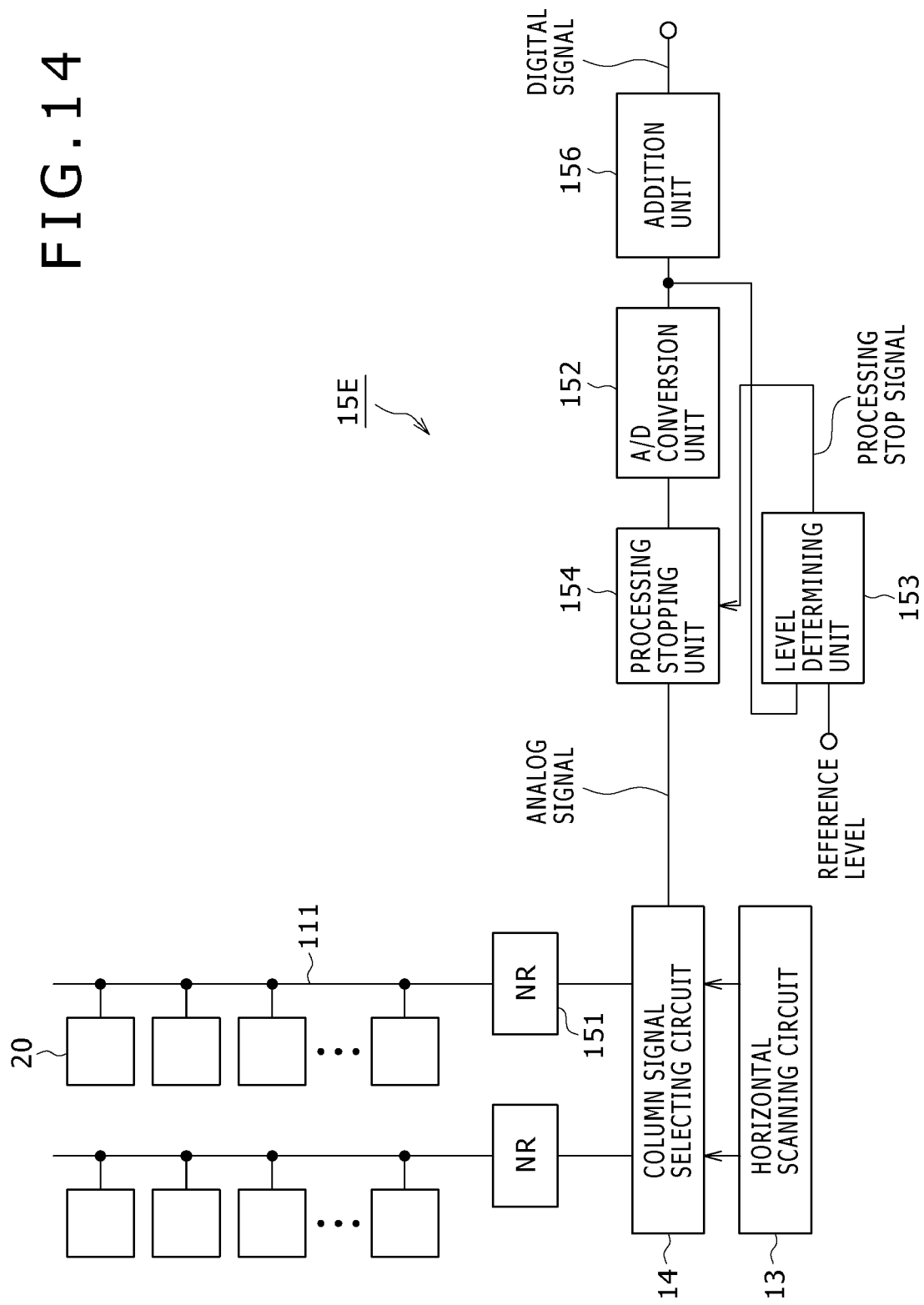
FIG. 14 is a block diagram showing an example of a configuration of a signal processing circuit of Example 5.

FIG. 14 is a block diagram showing an example of a configuration of a signal processing circuit 15E of Example 5. In the figure, units equal to those previously described with reference to FIG. 10 are designated by the same reference numerals, respectively.

The signal processing circuit 15E of Example 5 adopts the following configuration. That is to say, the level determining unit 153 compares the digital value obtained through the A/D conversion in the A/D conversion unit 152 with the reference level. The processing stopping unit 154 is disposed on a side of a preceding stage of the A/D conversion unit 152. Thus, when the determination result is supplied in the form of the processing stop signal from the level determining unit 153 to the processing stopping unit 154, the processing stopping unit 154 instructs the A/D conversion unit 152 to stop the A/D conversion processing for subsequent ones of or subsequent all of the output signals which are read out on the partition transfer basis after that time.

A technique for setting the input to the A/D conversion 152 at zero, a technique for stopping a control signal or a clock for the A/D conversion 152, a technique for stopping the supply of an enable signal in the case of adopting a configuration such that the A/D conversion unit 152 executes the addition processing in response to the enable signal, or the like is expected as a technique for stopping the A/D conversion processing by the processing stopping unit 154 similarly to the case of Example 3.

Note that, it is to be understood that a configuration that the noise removing unit 151 is disposed within the signal processing circuit 15C may be adopted similarly to the case of Example 1.

As has been described so far, in the CMOS image sensor 10A which carries out the charge transfer and the signal output on the partition basis when all the accumulated charges in the photoelectric conversion element 21 can not be read out in one reading-out operation, when the signals outputted from the unit pixel 20 on the partition transfer basis are added to one another, the addition processing is executed when each of the levels of the output signals is equal to or higher than the reference level, and the photoelectric conversion element 21 is in the state in which all the accumulated charges in the photoelectric conversion element 21 have been read out (or in the state in which the quantity of remaining charges is less)

when each of the levels of the remaining output signals is lower than the reference level. Thus, the addition processing is stopped in the subsequent reading-out operations after that time. As a result, especially, when the luminance of the incident light is low, only the addition processing only for the number of times necessary for the reading-out operation is executed. Thus, the fixed pattern noises and the random noises in the reading-out operations are prevented from being summed up, respectively, which results in that the influence of the fixed pattern noises and the random noises is small, and the high S/N ratio is realized especially on the low luminance side. Consequently, the image quality of the captured image can be enhanced.

In addition, with regard to the reference level, as previously stated, the maximum quantity of charges able to be transferred in corresponding n-th time reading-out operation is set as Qfdn.max. Thus, when the level of the corresponding output signal is equal to or lower than the maximum quantity, Qfdn.max, of charges, the processing stop signal is generated. However, it is preferable that a certain margin $\Delta Q$ is set in consideration of the dispersion or the like in characteristics of the pixels, and a quantity, (Qfdn.max−$\Delta Q$), of charges less than the maximum quantity, Qfdn.max, of charges is set as the reference level.

In each of the signal processing circuits 15A to 15E of Examples 1 to 5 described above, the processing stopping unit 154 constitutes a control section for instructing the addition unit 156 to execute the addition processing for the output signals, having the signal levels each being equal to or higher than the reference level, of a plurality of output signals outputted from the unit pixel 20 on the partition transfer basis based on the determination result obtained from the level determining unit 153, specifically, instructing the addition unit 156 to execute the addition processing when each of the signal levels of a plurality of output signals is equal to or higher than the reference level, and instructing the addition unit 156 to stop the addition processing when each of the signal levels of a plurality of output signals is lower than the reference level.

It is noted that although in each of Examples 1 to 5 described above, the description has been given so far by giving, as the example, the case where when each of the signal levels of a plurality of output signals is lower than the reference level, all the addition processing for the subsequent output signals after that time is stopped, even when the addition processing for the subsequent output signals after that time is stopped just once, the fixed pattern noises and the random noises at that time are prevented from being summed up, respectively. As a result, it is possible to suppress the influence of the fixed pattern noises and the random noises.

(Level Determining Unit)

Figure 15:
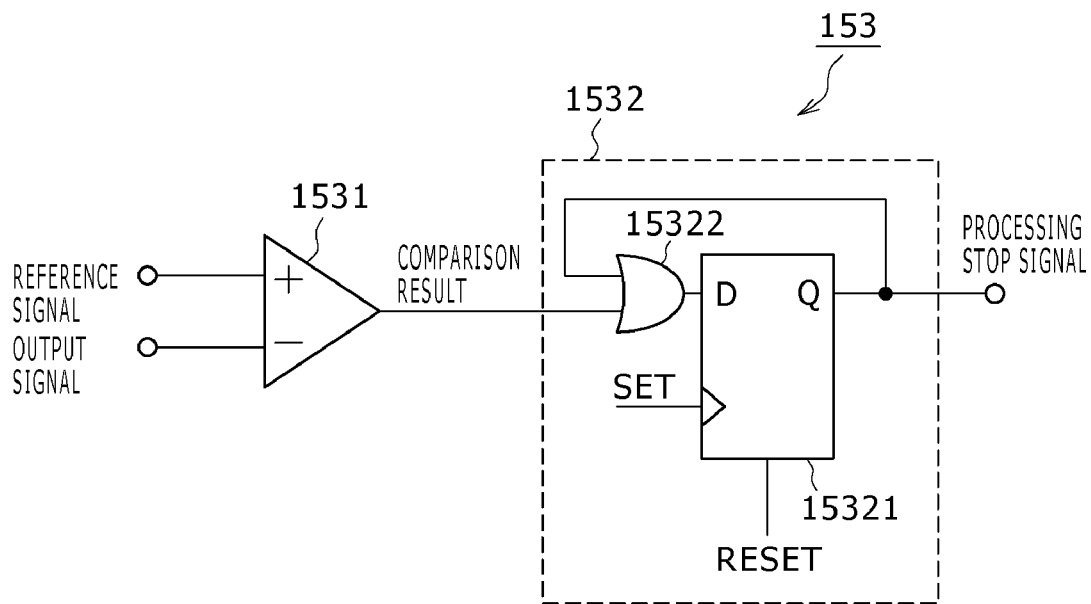
FIG. 15 is a block diagram showing an example of a configuration of a level determining unit.

FIG. 15 is a block diagram showing an example of a configuration of the level determining unit 153. In this case, the case of the level determination for the analog signal is given as an example.

The level determining unit 153 of this example includes a level comparator 1531 and a processing stop signal holding unit 1532.

Figure 16:
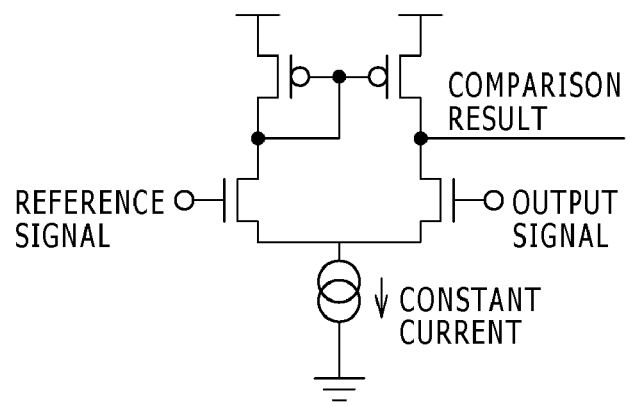
FIG. 16 is a circuit diagram showing an example of a configuration of a level comparing unit in the level determining unit shown in FIG. 15.

The level comparator 1531, for example, is configured in the form of a differential amplification circuit as shown in FIG. 16. The level comparator 1531 receives the output signal transferred on the partition transfer basis at its inverting (−) input terminal, and receives the reference signal at its non-inverting (+) output terminal, compares the level of the output signal with that of the reference signal, and outputs the comparison result in the form of the processing stop signal.

The processing stop signal holding unit 1532 includes a latch circuit 15321 constituted by a D-type flip-flop, and a logical sum circuit 15322. Here, the logical sum circuit 15322 receives as its two inputs the processing stop signal as the comparison result obtained from the level comparator 1531, and a Q output from the latch circuit 15321, and outputs a D input to the latch circuit 15321.

The level determining unit 153 has a circuit configuration corresponding to the case where the processing stop is continuously desired to be executed even in the subsequent reading-out operation after generation of the processing stop signal based on the comparison in the level comparator 1531. When no processing stop is performed, in the subsequent reading-out operation after the generation of the processing stop signal, the processing stop signal holding unit 1532 for holding therein the processing stop signal has to be omitted.

Figure 17:
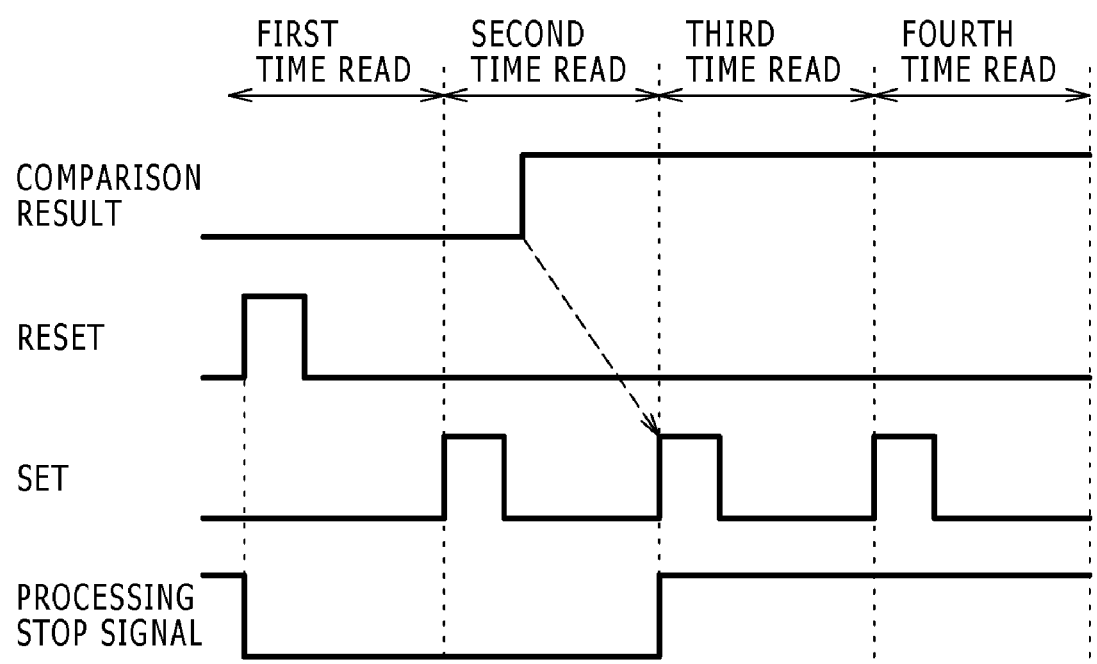
FIG. 17 is a timing chart explaining an operation of the level determining unit shown in FIG. 15.

An operation of the level determining unit 153 described above will now be described with reference to a timing chart of FIG. 17.

The latch circuit 15321 is reset by a reset signal RESET, which results in that the processing stop signal as a Q output of the latch circuit 15321 becomes a low level (hereinafter referred to as an "L" level). Next, when the comparison result from the level comparator 1531 becomes a high level (hereinafter referred to as an "H" level), the latch circuit 15321 holds therein the comparison result at the "H" level in accordance with a next set signal SET, and continues to hold therein the comparison result irrespective of the comparison result until the reset signal RESET is inputted thereto.

In the case of the circuit example shown in FIG. 15, the processing stop signal becomes the "H" level in the second time reading-out operation. Thus, even when the comparison result from the level comparator 1531 in third time or fourth time reading-out operation is at the "L" level, the processing stop signal is held at the "H" level.

In addition, when immediate reflection is desired to be made such that the addition processing is stopped in and after the second time reading-out operation in which the comparison result from the level comparator 1531 becomes the "H" level, the comparison result and the processing stop signal may be logically summed up.

Note that, the case of the level determination for the analog signal has been described so far as an example. However, in the case of the level determination for the digital signal, any of a method of performing simple subtraction, a method of determining whether a certain digit in a bit width of a digital signal is "1" or "0", and a method of determining whether a certain digit becomes "1" or "0" during the A/D conversion may be adopted as long as a level comparison can be carried out based on a resolution of a reference level by utilizing the same.

Second Embodiment

Figure 18:
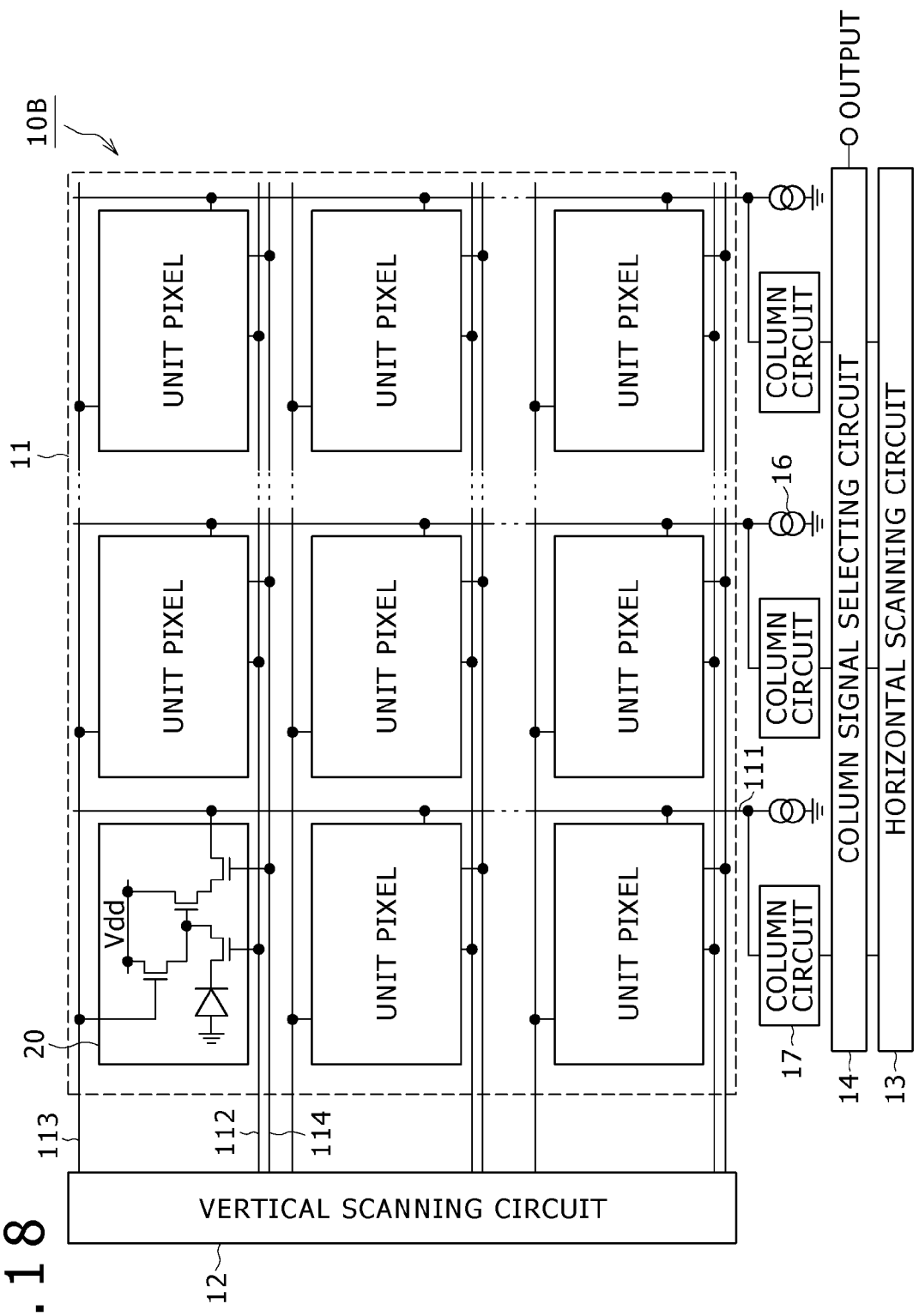
FIG. 18 is a system configuration diagram showing a CMOS image sensor according to a second embodiment of the present invention.

FIG. 18 is a system configuration diagram showing a configuration of a solid-state imaging device, for example, a CMOS image sensor according to a second embodiment of the present invention. In the figure, units equal to those previously described with reference to FIG. 1 are designated by the same reference numerals, respectively.

As shown in FIG. 18, a CMOS image sensor 10B of this embodiment includes a plurality of column circuits 17 which are arranged so as to correspond to the pixel columns of the pixel array unit 11, respectively, in addition to the pixel array unit 11, the vertical scanning circuit 12, the horizontal scanning circuit 13, and the column signal selecting circuit 14 are included. The column circuit 17 executes the various signal processing such as the noise removing processing, the A/D conversion processing, and the addition processing for the signals of the pixels 20 which are outputted in units of the pixels from the pixel array unit 11 through the vertical signal line 111. Any other suitable configuration other than the above configuration is basically the same as that of the CMOS image sensor 10A of the first embodiment.

The CMOS image sensor 10B of this embodiment also executes the addition processing or the A/D conversion processing is executed when the signal level is equal to or higher than a reference level similarly to the case of the CMOS image sensor 10A of the first embodiment. Thus, when there is obtained the output lower than each of maximum values in the individual partition transfer operations, that is, a maximum quantity, Qfd1.max, of charges able to be transferred in the first time transfer operation, a maximum quantity, Qfd2.max, of charges able to be transferred in the second time transfer operation, . . . , it is determined that the reading-out operation for reading out all the accumulated charges having the quantity Qpd. The subsequent addition processing or A/D conversion processing after that time is then stopped. The control is carried out in the manner as described above. Also, the control is carried out in each of the column circuits 17.

Hereinafter, a description will be given with respect to concrete Examples of the column circuit 17 for carrying out the control such that when there is obtained the output lower than each of the maximum quantity, Qfd1.max, of charges able to be transferred in the first time transfer operation, a maximum quantity, Qfd2.max, of charges able to be transferred in the second time transfer operation, . . . , it is determined that the reading-out operation for reading out all the accumulated charges having the quantity Qpd, and the subsequent addition processing or A/D conversion processing after that time is then stopped.

Example 1

Figure 19:
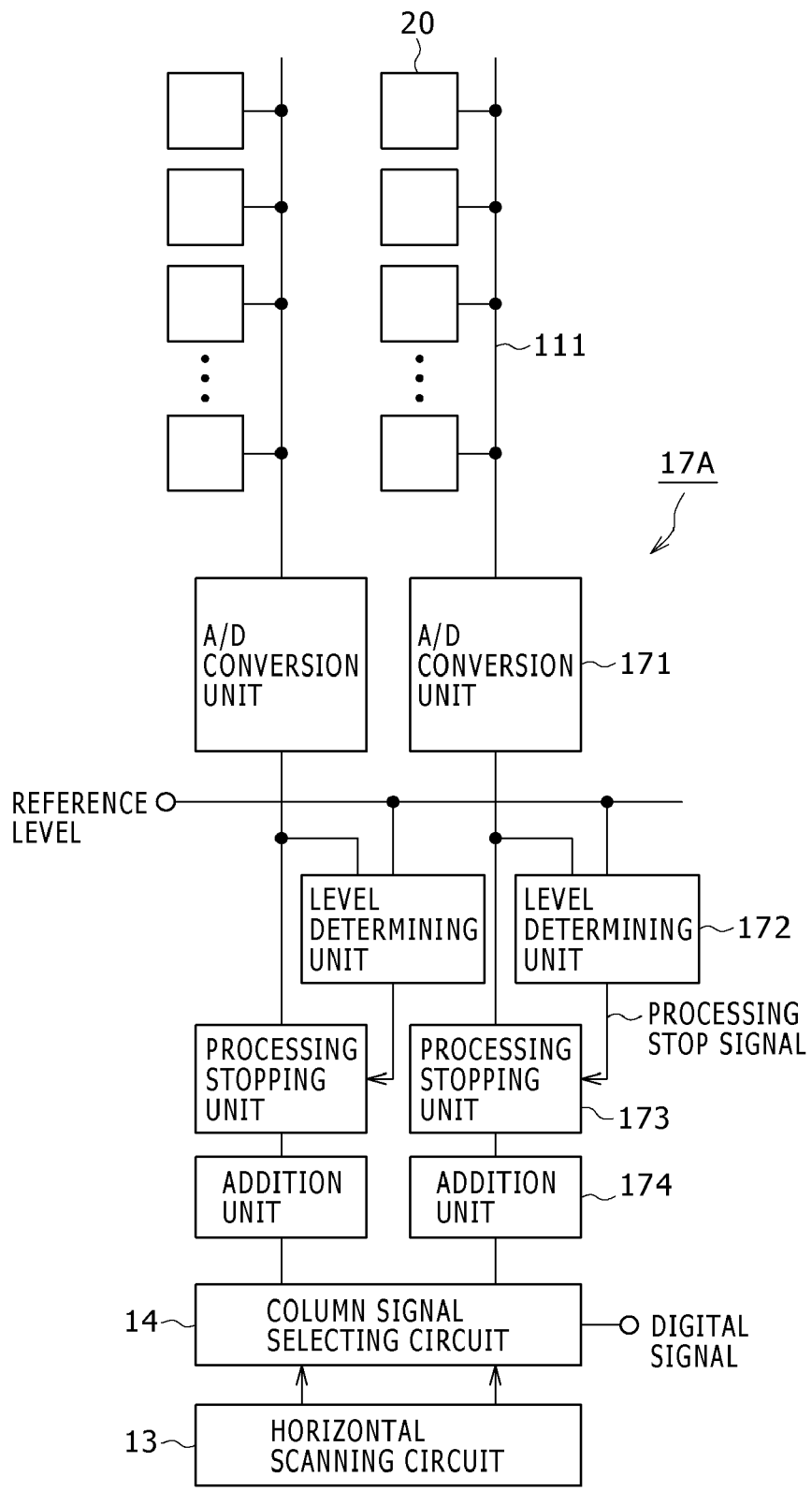
FIG. 19 is a block diagram showing an example of a configuration of a column circuit of Example 1.

FIG. 19 is a block diagram showing an example of a configuration of a column circuit 17A of Example 1. The column circuit 17A of Example 1 includes an A/D conversion unit 171, a level determining unit 172, a processing stopping unit (control section) 173, and an addition unit 174. Although an illustration is omitted here, it is also possible to adopt a configuration such that a noise removing unit corresponding to the noise removing unit 151 shown in FIG. 10 is provided on a side of a preceding stage of the A/D conversion unit 171.

The A/D conversion unit 171 converts an analog output signal transferred on the partition transfer basis from the unit pixel 20 of the pixel array unit 11 through the vertical signal line 111 into a digital signal. The level determining unit 172 compares a digital value of the digital signal obtained through the A/D conversion in the A/D conversion unit 171 with a reference level. When the digital value is determined to be lower than the reference level, the level determining unit 172 outputs a determination result, and supplies the determination result in the form of a processing stop signal to the processing stopping unit 154. The reference level is set so as to correspond to the maximum quantity, Qfd1.max, of charges able to be transferred in the first time transfer operation, the maximum quantity, Qfd2.max, of charges able to be transferred in the second time transfer operation, . . . .

When the determination result is supplied from the level determining unit 172, the processing stopping unit 173 instructs the addition unit 174 to stop addition processing to be executed therein for the digital signal outputted from the A/D conversion unit 171 along with the partition transfer. A technique for setting the input to the addition unit 174 at zero, a technique for stopping a control signal or a clock for the address unit 174, a technique for stopping the supply of an enable signal in the case of adopting a configuration such that the addition unit 174 executes the addition processing in response to the enable signal, or the like is expected as a technique for stopping the addition processing by the processing stopping unit 173.

When the addition processing is stopped in accordance with the instruction issued from the processing stopping unit 173, the addition unit 174 stops to execute the addition processing (it is assumed that the case of adding zeros is also contained in the concept of stop of the addition processing). However, in any other case other than the above case, the addition unit 174 executes the processing for adding the digital signals which are successively supplied from the A/D conversion unit 171 along with the partition transfer to output the resulting signal in the form of a pixel signal of one pixel.

Example 2

Figure 20:
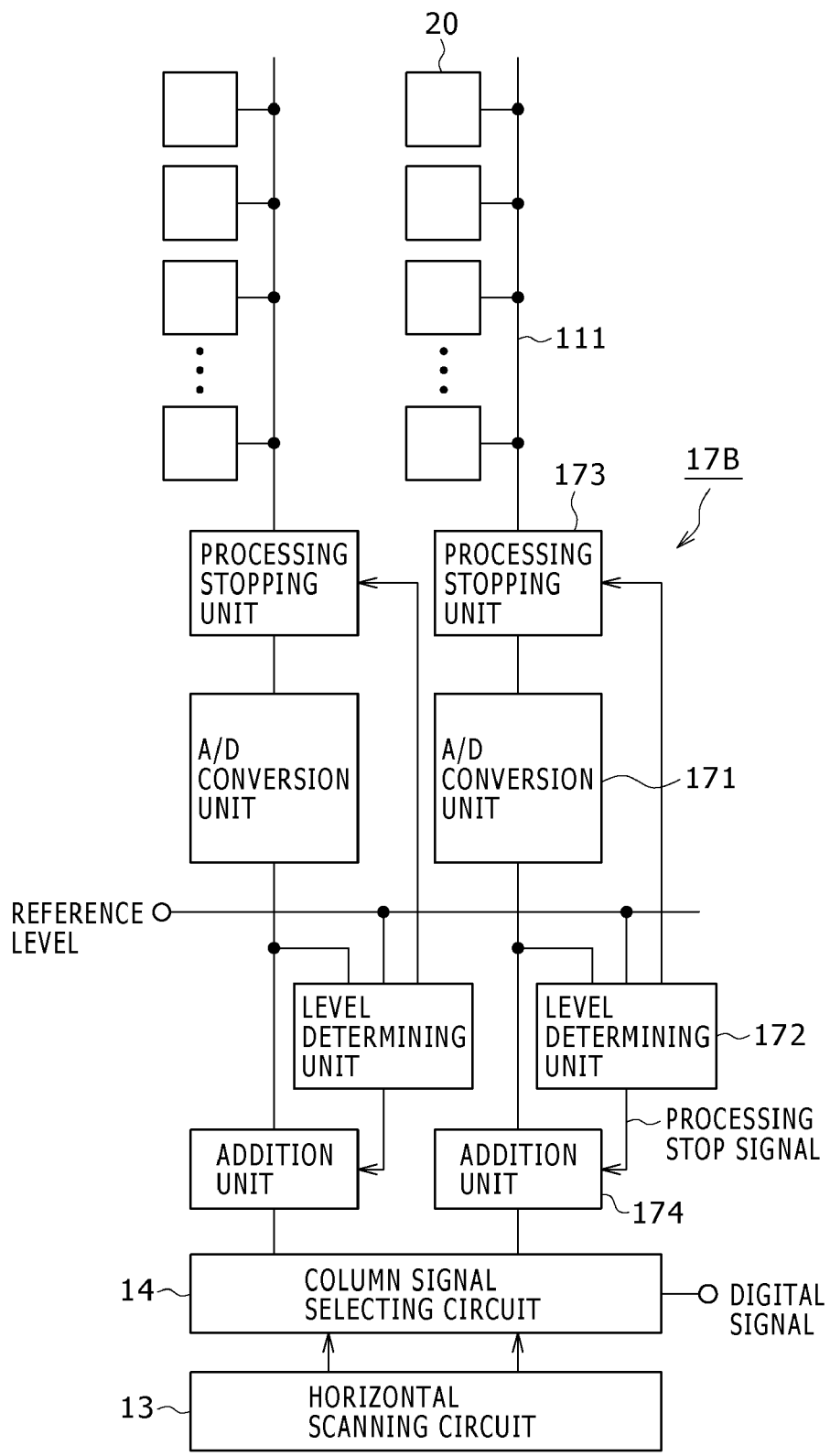
FIG. 20 is a block diagram showing an example of a configuration of a column circuit of Example 2.

FIG. 20 is a block diagram showing an example of a configuration of a column circuit 17B of Example 2. In the figure, units equal to those previously described with reference to FIG. 19 are designated by the same reference numerals, respectively.

The column circuit 17B of Example 2 adopts the following configuration. That is to say, the level determining unit 172 compares the digital value obtained through the A/D conversion in the A/D conversion unit 171 with the reference level. The processing stopping unit 173 is disposed on a side of a preceding stage of the A/D conversion unit 171. Thus, when the determination result is supplied in the form of the processing stop signal from the level determining unit 172 to the processing stopping unit 173, the processing stopping unit 173 instructs the A/D conversion unit 171 to stop the A/D conversion processing for subsequent ones of or subsequent all of the output signals which are read out on the partition transfer basis after that time.

A technique for setting the input to the A/D conversion 171 at zero, a technique for stopping a control signal or a clock for the A/D conversion 171, a technique for stopping the supply of an enable signal in the case of adopting a configuration such that the A/D conversion unit 171 executes the addition processing in response to the enable signal, or the like is expected as a technique for stopping the A/D conversion processing by the processing stopping unit 173.

Example 3

Figure 21:
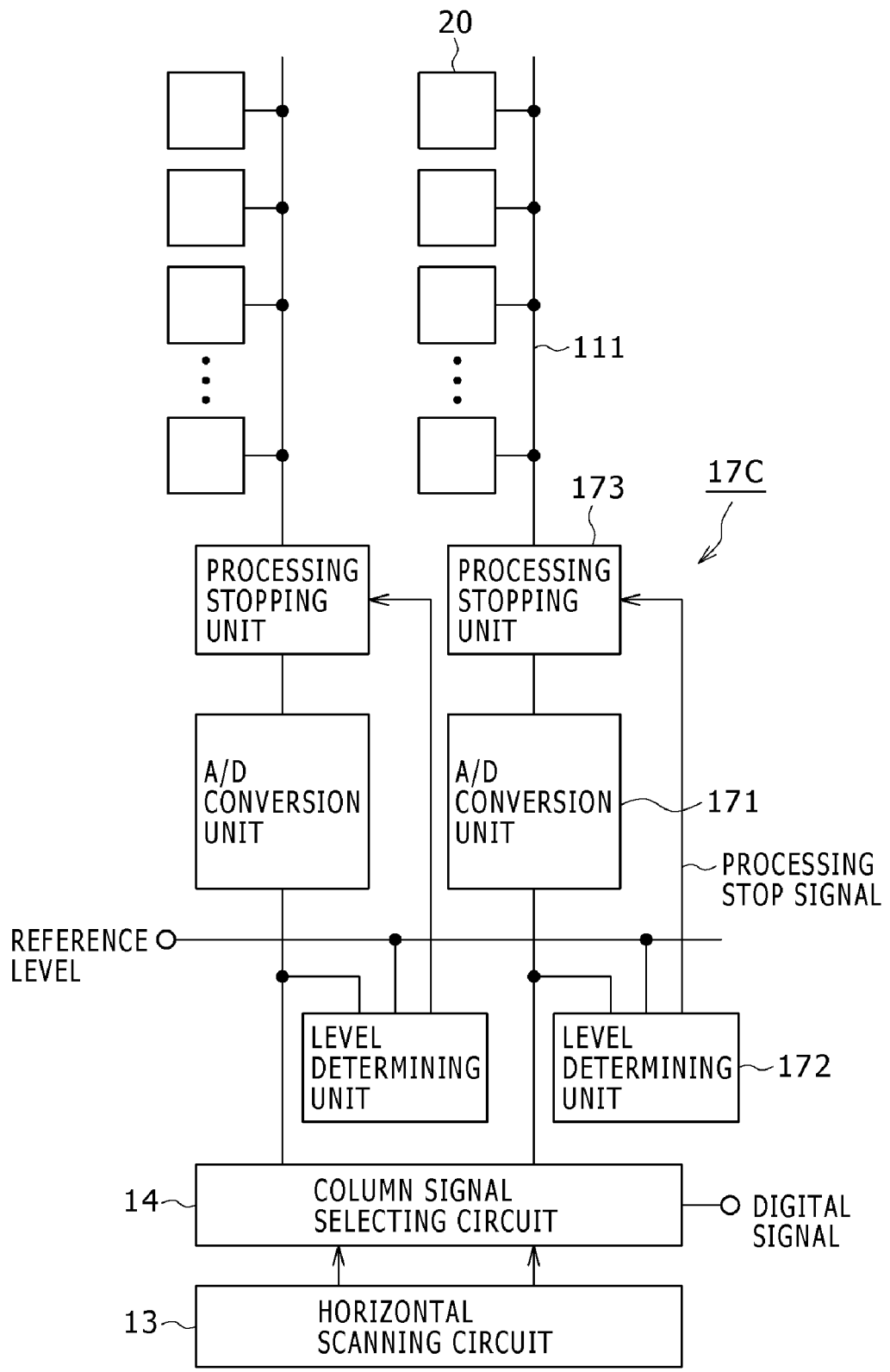
FIG. 21 is a block diagram showing an example of a configuration of a column circuit of Example 3.

FIG. 21 is a block diagram showing an example of a configuration of a column circuit 17C of Example 3. In the figure, units equal to those previously described with reference to FIG. 19 are designated by the same reference numerals, respectively.

In the column circuit 17C of Example 3, the A/D conversion unit 171 has a noise removing (CDS) function and an addition function in addition to the A/D conversion function in the column circuit 17B of Example 2.

<A/D Conversion Unit and Processing Stopping Unit>

Figure 22:
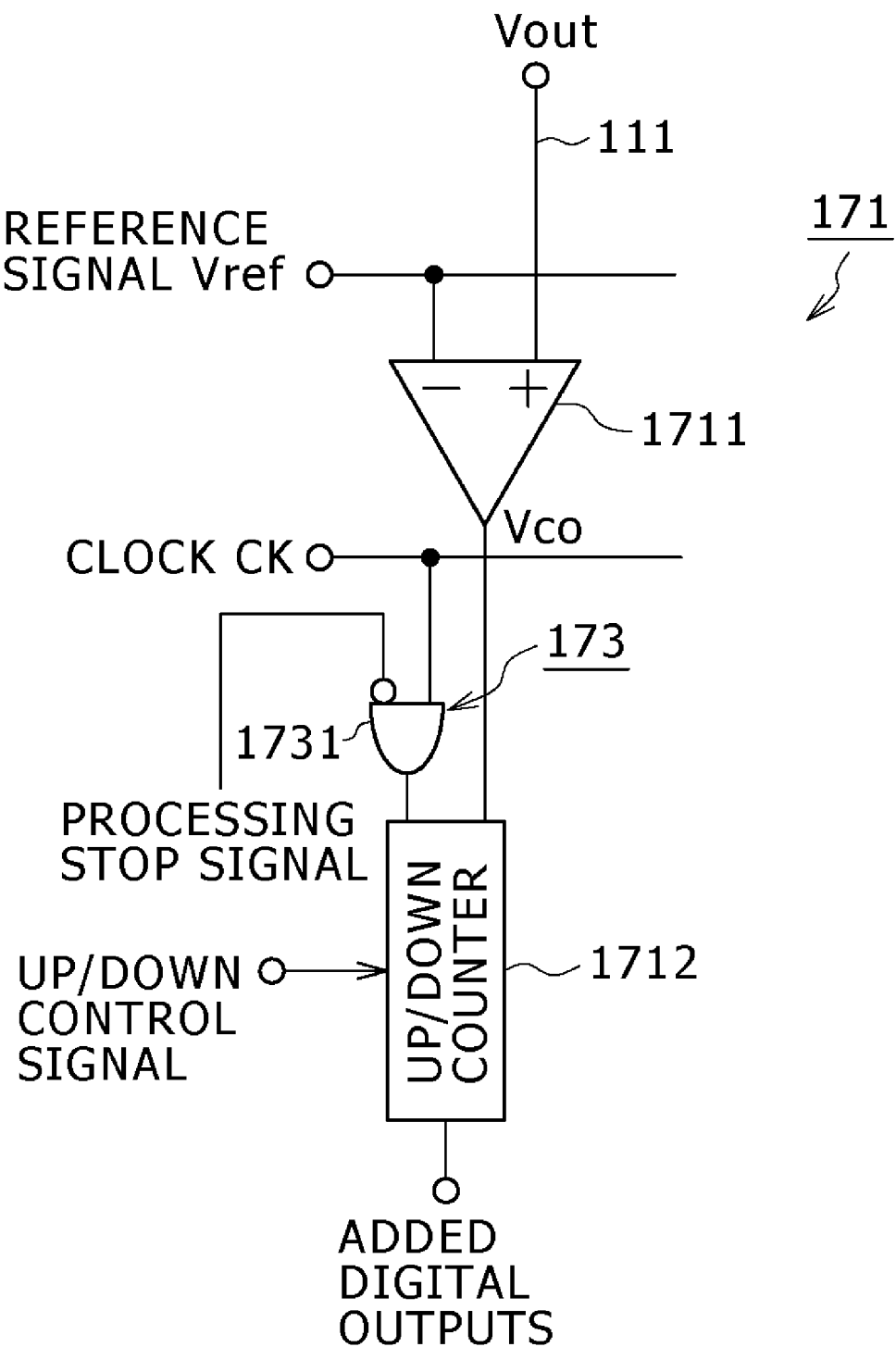
FIG. 22 is a block diagram showing an example of concrete configurations of an A/D conversion unit and a processing stopping unit.

FIG. 22 is a block diagram showing an example of concrete configurations of the A/D conversion unit 171 and the processing stopping unit 173.

As shown in FIG. 22, the A/D conversion unit 171 of this example includes a voltage comparator 1711 and a counter 1712. In addition, the processing stopping unit 173 of this example is composed of a logical product circuit 1731.

The voltage comparator 1711 receives a reference signal Vref having a ramp waveform at its inverting (−) input terminal, and receives an output signal Vout supplied from the unit pixel 20 through the vertical signal line 111 at its non-inverting (+) terminal. When the output signal Vout is higher in level than the reference signal Vref, the voltage comparator 1711 outputs a comparison result Vco.

The counter 1712 is constituted by an up/down counter. The counter 1712 carries out a count operation for up-count/down-count synchronously with a clock CK under the control based on an up/down control signal for a period of time required for the comparison result Vco in the voltage comparator 1711 to change, thereby incrementing or decrementing a count value.

More specifically, when the reset level is read out, the counter 1712 decrements the count value by the down count, while when the signal level is read out, the counter 1712 increments the count value by the up count. As a result, the noise removing processing for obtaining a difference between the reset level and the signal level can be executed concurrently with the A/D conversion processing.

Moreover, when the second time A/D conversion processing for the reset level and the signal level is similarly executed so as to follow obtaining the result of the first time A/D conversion processing, the count value becomes a sum of the result of the first time A/D conversion processing and the result of the second time A/D conversion processing. Therefore, the addition processing can also be simultaneously executed.

It is noted that the counter 1712 does not necessarily down-count the reset level. That is to say, processing may also be adopted such that after the reset level is up-counted, "1" is added to the signal level, right before reading-out of the signal level, to invert the signal level, thereby treating the signal level as a negative value, and the signal level is similarly up-counted.

In addition thereto, the following processing may also be adopted. That is to say, when the total count value in reading out the reset level is N, and the count value corresponding to the value of the reset level is Nsig, a count value (N−Nsig) until the counting of the total count value N is completed after change of the comparison result Vco is counted, and a count value Msig corresponding to the value of the signal level is counted to output the resulting value in the form of (N−Nsig−Msig). After that, finally, the total count value N as the known value is subtracted from the value (N−Nsig−Msig), thereby obtaining the signal output (Msig−Nsig) after noise removal.

The logical product circuit 1731 receives the clock CK at one input terminal, and receives the processing stop signal at the other input terminal having a negative logic. When the processing stop signal is supplied from the level determining unit 172, the logical product circuit 1731 stops the clock CK from being inputted to the counter 1712, thereby stopping the counting operation of the counter 1712, that is, the A/D conversion processing, the noise removing processing, and the addition processing of the A/D conversion unit 171.

Subsequently, a description will now be given with respect to operation timings of the A/D conversion unit 341 having the configuration described above, that is, the A/D conversion unit 341 having the noise removing function and the addition function with reference to a timing chart of FIG. 23. In this case, it is assumed that the description is given by giving, as an example, the case where all the charges are read out in the first two reading-out operations as shown in FIG. 8B.

The level determination in the level determining unit 172 is carried out for the signal for which the A/D conversion processing and the addition processing are executed. Therefore, with respect to the reference level, values which are obtained by accumulatively adding the maximum quantity, Qfd1.max, of charges transferred in the first reading-out operation on the partition transfer basis, the maximum quantity, Qfd2.max, of charges transferred in the second reading-out operation on the partition transfer basis, . . . are set as the reference levels in the respective reading-out operations.

Figure 23:
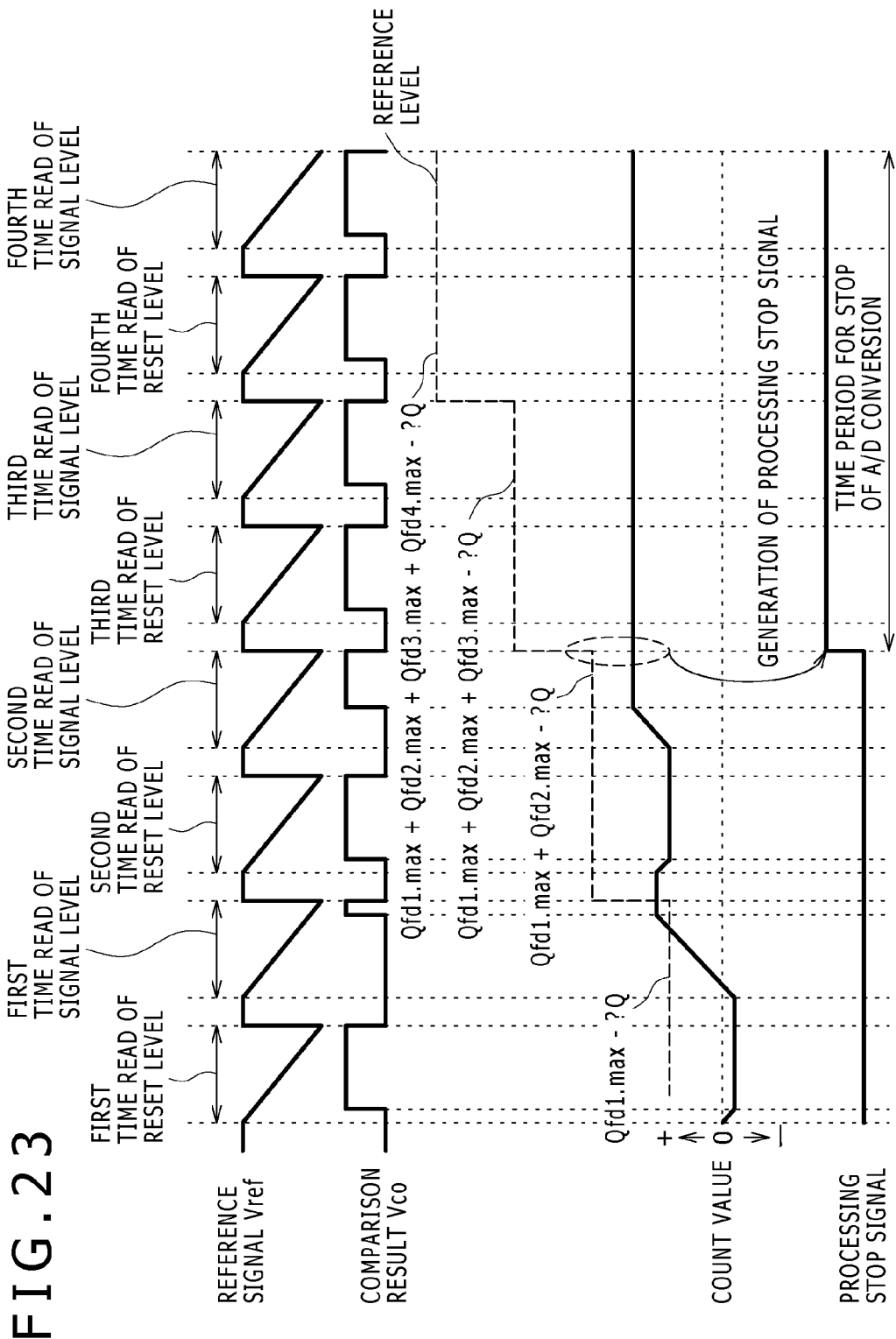
FIG. 23 is a timing chart showing operation timings of the A/D conversion unit having a noise removing function and an addition function.

In the example shown in FIG. 23, as previously stated, ΔQ is set as a margin for the dispersion in characteristics of the pixels. Thus, the reference level for the first time reading-out operation is set as (Qfd1.max−ΔQ), the reference level for the second time reading-out operation is set as (Qfd1.max+Qfd2.max−ΔQ), and so forth.

The comparison of the signal level with the reference level is carried out at a timing at which the reading-out of the signal level is completed, the processing stop signal is generated in the second time reading-out operation to stop the A/D conversion processing in and after the third time reading-out operation. For this reason, the value which is obtained by adding only the first time reading-out result and the second time reading-out result to each other is obtained based on the output of the A/D conversion processing and the addition processing.

Note that, although in each of Examples 1, 2 and 3, the level determining unit 172 compares the digital value with the reference level on the side of the subsequent stage of the A/D conversion unit 171, it is also possible to adopt a configuration that the level determining unit 172 compares the digital value with the reference level on the side of the preceding stage of the A/D conversion unit 171.

In addition, for the level determining unit 172 of each of Examples 1, 2 and 3, it is possible to use the same configuration as that of the level determining unit 153 shown in FIG. 15.

As has been described so far, in the CMOS image sensor 10B utilizing the driving method based on the partition transfer, when the signal level is equal to or higher than the reference level, the addition processing or the A/D conversion processing is executed, and when the signal level becomes lower than the reference level, the addition processing or the A/D conversion processing is stopped in the reading-out operation in and after that time. As a result, only the addition processing or the A/D conversion processing only for the number of times necessary for the reading-out operation is executed especially in the case of the low luminance. Thus, the fixed pattern noises and the random noises in the reading-out operations are prevented from being summed up, respectively, which results in that the influence of the fixed pattern noises and the random noises is small, and the high S/N ratio is realized especially on the low luminance side. Consequently, the image quality of the captured image can be enhanced.

In each of the column circuits 17A to 17C of Examples 1 to 3 described above, the processing stopping unit 173 constitutes a control section for instructing the addition unit 174 to execute the addition processing for the output signals, having the signal levels each being equal to or higher than the reference level, of a plurality of output signals outputted from the unit pixel 20 on the partition transfer basis in accordance with the determination result obtained from the level determining unit 172, specifically, instructing the addition unit 174 to execute the addition processing when each of the signal levels of a plurality of output signals is equal to or higher than the reference level, and instructing the addition unit 174 to stop the addition processing when each of the signal levels of a plurality of output signals is lower than the reference level.

Third Embodiment

Figure 24:
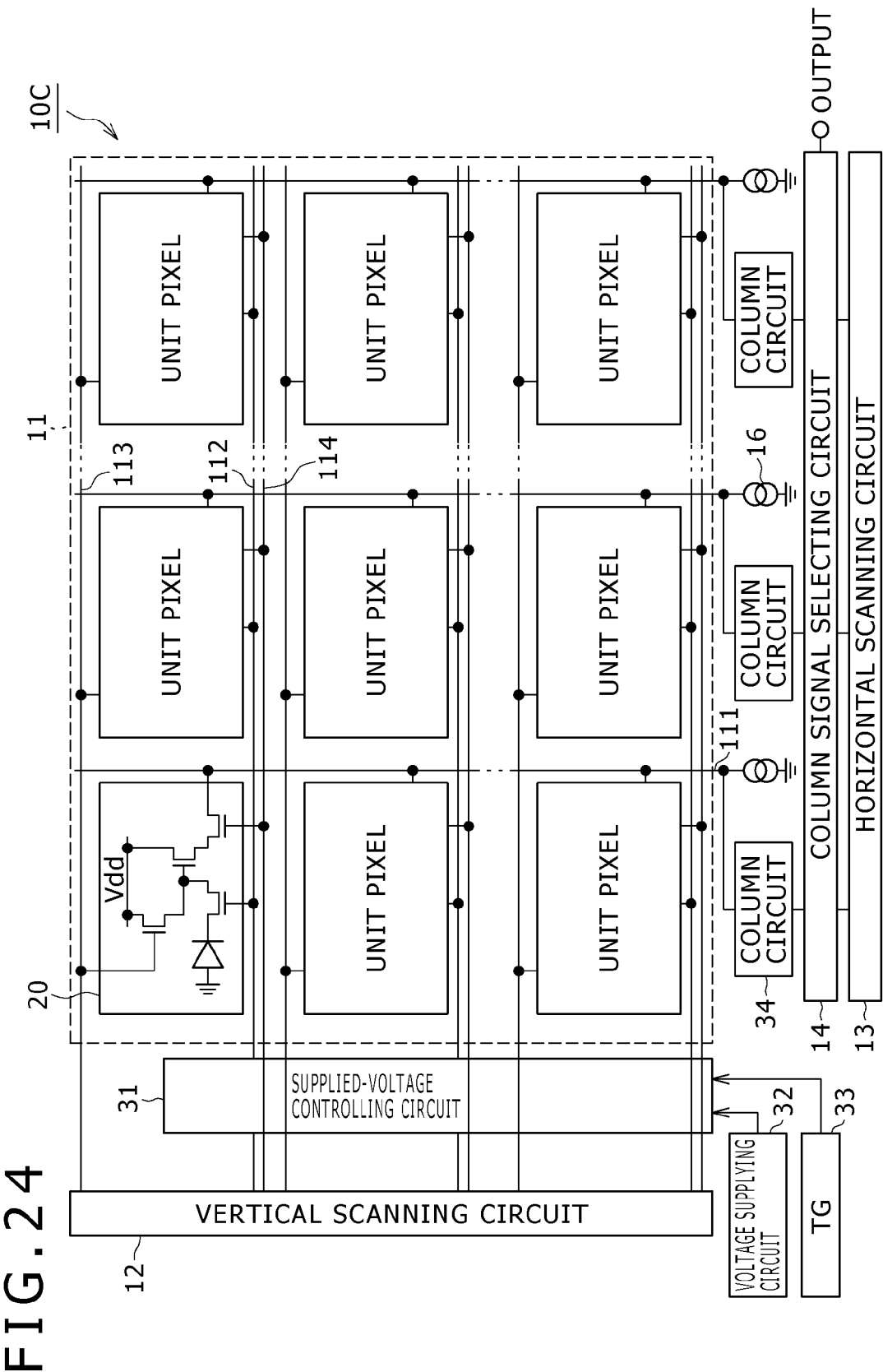
FIG. 24 is a system configuration diagram showing a CMOS image sensor according to a third embodiment of the present invention.

FIG. 24 is a system configuration diagram showing a configuration of a solid-state imaging device, for example, a CMOS image sensor according to a third embodiment of the present invention. In the figure, units equal to those previously described with reference to FIG. 1 are designated by the same reference numerals, respectively.

As shown in FIG. 24, the CMOS image sensor 10C of this embodiment includes a supplied-voltage controlling circuit 31, a voltage supplying circuit 32 and a timing generating circuit (TG) 33 in addition to the pixel array unit 11, the vertical scanning circuit 12, the horizontal scanning circuit 13, and the column signal selecting circuit 14. Also, the CMOS image sensor 10C includes a plurality of column circuits 34 which are arranged so as to correspond to the pixel columns of the pixel array unit 11, respectively. Any other suitable configuration other than the above configuration is basically the same as that of the CMOS image sensor 10B of the second embodiment.

The supplied-voltage controlling circuit 31 controls a voltage value (peak value) of a transfer pulse TRG applied to the gate electrode (control electrode) of the transfer transistor (transfer element) 22 within the unit pixel 20. A concrete configuration of this supplied-voltage controlling circuit 31 will be described later.

The voltage supplying circuit 32 supplies a plurality of control voltages having different voltage values to the supplied-voltage controlling circuit 31. The plurality of control voltages are supplied as the transfer pulses TRG having the different voltage values to the gate electrode of the transfer transistor 22. The details of the transfer pulses TRG having the different voltage values will be described later.

The timing generating circuit (TG) 33 generates a timing signal PTRG in accordance with which a timing is determined when the voltage supplying circuit 32 supplies a plurality of transfer pulses TRG having the different voltage values to the gate electrode of the transfer transistor 22.

The column circuit 34 executes the various signal processing such as the noise removing processing, the A/D conversion processing, and the addition processing for the signals of the pixels 20 which are outputted in units of the pixels from the pixel array unit 11 through the vertical signal line 111. A concrete configuration and an operation of the column circuit 34 will be described later.

(Supplied-Voltage Controlling Circuit)

The supplied-voltage controlling circuit 31 receives as its input an address signal ADR in accordance with which the unit pixels 20 belonging to the row selected through the vertical scanning operation by the vertical scanning circuit 12 are driven to select one of a plurality of voltages supplied from the voltage supplying circuit 32, thereby supplying the voltage thus selected as the transfer pulse TRG to the gate electrode of the transfer transistor 22 within the unit pixel 20.

An ON voltage Von by which the transfer transistor 22 is turned ON, an OFF voltage Voff by which the transfer transistor 22 is turned OFF, and an intermediate voltage Vmid between the ON voltage and the OFF voltage are supplied as a plurality of voltages from the voltage supplying circuit 32. Here, the intermediate voltage Vmid means a voltage by which while a part of the accumulated charges in the photoelectric conversion element 21 is held, the remaining accumulated charges can be partially transferred to the floating diffusion capacitor 26.

In the pixel circuit described above, since the transfer transistor 22 is of the N-channel, the ON voltage is set as the power source voltage Vdd, and the OFF voltage Voff is set as the grounding voltage, preferably, set as a voltage lower than the grounding voltage. In addition, in this embodiment, two intermediate voltages Vmid0 and Vmid1 having different voltage values are used as the intermediate voltage Vmid.

As a result, the four voltages, that is, the ON voltage Von, the intermediate voltages Vmid0 and Vmid1, and the OFF voltage Voff are supplied from the voltage supplying circuit 32 to the supplied-voltage controlling circuit 31. The four voltages show a relationship of Voff<Vmid0<Vmid1<Von. Also, each of the intermediate voltages Vmid0 and Vmid1, and the ON voltage Von of the four voltages is used as the transfer pulse TRG.

In order to control timings at which the intermediate voltages Vmid0 and Vmid1, and the ON voltage Von are supplied from the voltage supplying circuit 32, respectively, three timing signals PTRG1, PTRG2 and PTRG3 are supplied from the timing generating circuit 33 to the supplied-voltage controlling circuit 31. The supplied-voltage controlling circuit 31 selects one of the intermediate voltages Vmid0 and Vmid1, and the ON voltage Von based on the timing signals PTRG1, PTRG2 and PTRG3, and supplies the selected one as the intermediate voltage Vmid to the gate electrode of the transfer transistor 22.

Figure 25:
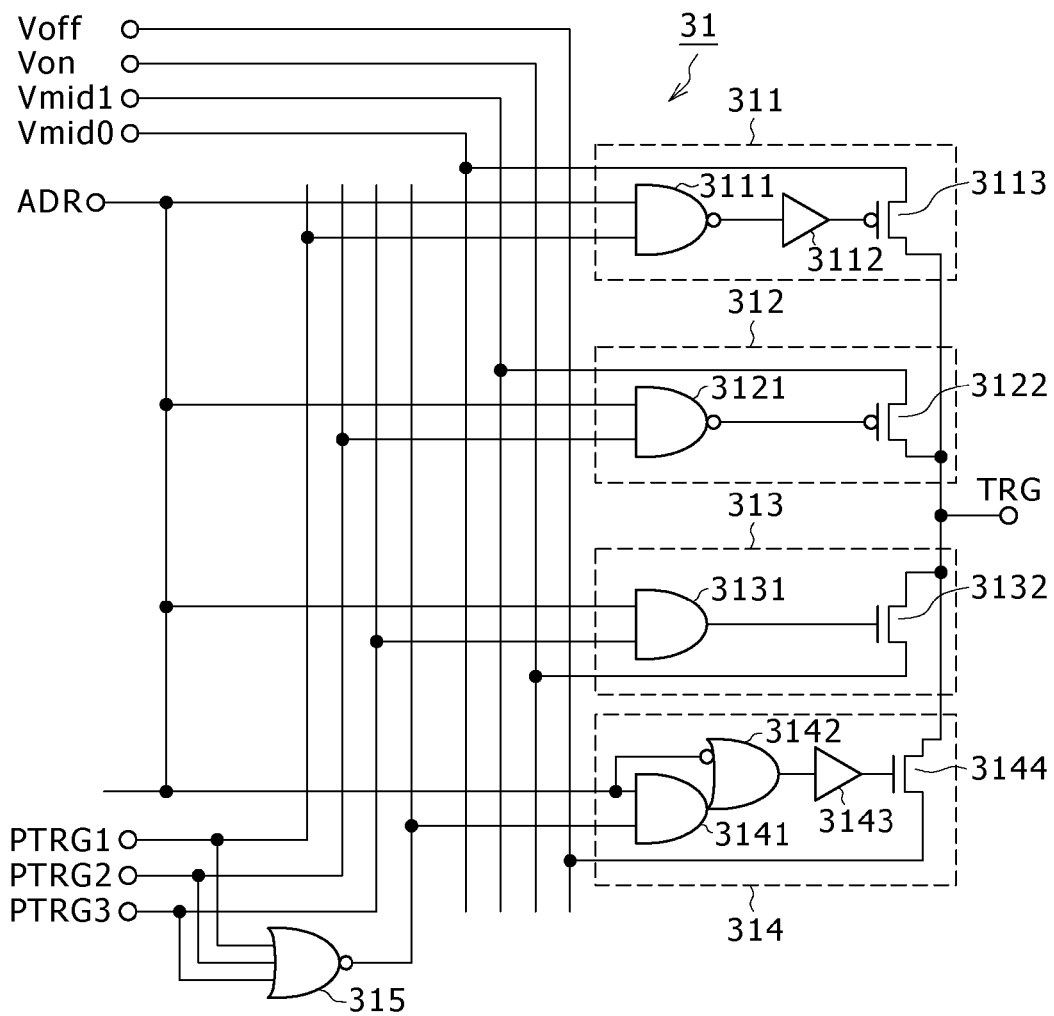
FIG. 25 is a circuit diagram showing an example of a circuit configuration of a supplied-voltage controlling circuit shown in FIG. 24.

FIG. 25 is a circuit diagram showing an example of a circuit configuration of the supplied-voltage controlling circuit 31. As shown in FIG. 25, the supplied-voltage controlling circuit 31 includes four circuit blocks 311 to 314 corresponding to the four voltages, that is, the intermediate voltages Vmid0 and Vmid1, the ON voltage Von, and the OFF voltage Voff, respectively, and 3-input NOR circuit 315.

An address signal ADR is commonly supplied from the vertical scanning circuit 12 to each of the circuit blocks 311 to 314. The timing signals PTRG1, PTRG2 and PTRG3 are supplied as three inputs from the timing generating circuit 33 to the NOR circuit 315.

The circuit block 311 includes a NAND circuit 3111 for receiving its two inputs the address signal ADR and the timing signal PTRG1, a level shifter 3112, and a P-channel driving transistor 3113. The circuit block 311 selects the intermediate voltage Vmid0 and supplies the intermediate voltage Vmid0 thus selected to the gate electrode of the transfer transistor 22.

The circuit block 312 includes an NAND circuit 3121 for receiving as its two inputs the address signal ADR and the timing signal PTRG2, and a P-channel driving transistor 3122. The circuit block 312 selects the intermediate voltage Vmid1, and supplies the intermediate voltage Vmid1 thus selected to the gate electrode of the transfer transistor 22.

The circuit block 313 includes an AND circuit 3131 for receiving its two inputs the address signal ADR and a timing signal PTRG3, and an N-channel driving transistor 3132. The circuit block 313 selects the ON voltage Von and supplies the ON voltage Von thus selected to the gate electrode of the transfer transistor 22.

The circuit block 314 includes an AND circuit 3141 for receiving as its two inputs the address signal ADR and an output signal from the NOR circuit 315, an OR circuit 3142 for receiving the address signal ADR at one input terminal having a negative logic set thereat, and receiving an output signal from the AND circuit 3141 at the other input terminal, a level shifter 3143, and an N-channel driving transistor 3144. The circuit block 314 selects the OFF voltage Voff, and supplies the OFF voltage Voff thus selected to the gate electrode of the transfer transistor 22.

In order to supply a voltage lower than the grounding voltage, for example, −1.0 V as the OFF voltage Voff in accordance with which the transfer transistor 22 is turned OFF, the circuit block 314 adopts a circuit configuration for operating exclusively from other circuit blocks 311, 312 and 313 based on the operation of the NOR circuit 315.

Figure 26:
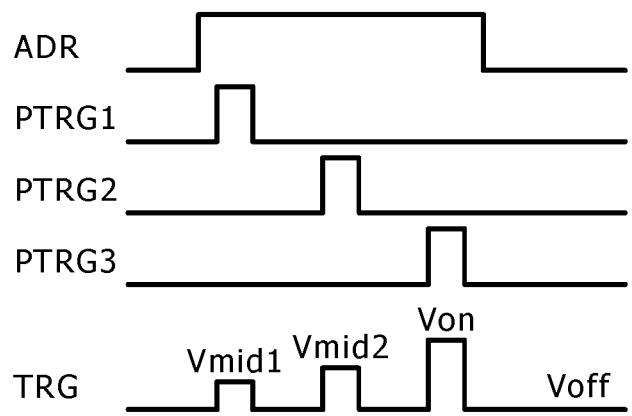
FIG. 26 is a timing chart showing a timing relationship between an inputting operation and an outputting operation in the supplied-voltage controlling circuit.

FIG. 26 shows a timing relationship between inputs and outputs to and from the supplied-voltage controlling circuit 31. In the case where it is assumed that the voltages to be supplied to the gate electrode of the transfer transistor 22 are the intermediate voltages Vmid0 and Vmid1, the ON voltage Von and the OFF voltage Voff, when the pixel row is selected by the address signal ADR, in accordance with the timing signals PTRG1, PTRG2 and PTRG3, the intermediate voltages Vmid0 and Vmid1, and the ON voltage Von corresponding thereto, respectively, are successively supplied to the gate electrode of the transfer transistor 22, and the OFF voltage Voff is supplied in the case other than the above case.

In the manner as described above, the intermediate voltages Vmid0 and Vmid1, and the ON voltage Von are successively supplied in this order from the supplied-voltage controlling circuit 31 to the gate electrode of the transfer transistor 22 every pixel row synchronously with the vertical scanning operation by the vertical scanning circuit 12 under the control made by the supplied-voltage controlling circuit 31. As a result, it is possible to realize the tri-partition transfer in which the signal charges accumulated in the photoelectric conversion element 21 are transferred to the floating diffusion capacitor 26, for example, in three batches.

<Tri-Partition Transfer>

Hereinafter, a concrete operation in the case of the tri-partition transfer in a certain pixel row will be described with reference to a timing chart of FIG. 27, and an operation explanatory diagram of FIG. 28. In FIG. 28, operations (1) to (11) correspond to periods, (1) to (11), of time shown in FIG. 27, respectively.

When the signal charges are transferred on the tri-partition transfer basis for an accumulation period of time of one unit in a certain pixel row, the reset pulse PTS is applied three times at given intervals from the vertical scanning circuit 12 to the gate electrode of the reset transistor 23, thereby carrying out the reset operation for the floating diffusion capacitor 26 three times. The intermediate voltages Vmid0 and Vmid1, and the ON voltage Von are successively supplied in this order from the supplied-voltage controlling circuit 31 to the gate electrode of the transfer transistor 22 when a certain period of time elapses every reset operation synchronously with this reset operations.

For the period (1) of time, the charges Qpd are accumulated in the photoelectric conversion element 21. At this time, the OFF voltage Voff is applied to the gate electrode of the transfer transistor 22. In addition, the floating diffusion capacitor 26 has already been reset by the first time reset pulse RST. A reset level of the floating diffusion capacitor 26 is read out in the form of a first time reset level to the vertical signal line 111 through the amplification transistor 24 and the selection transistor 25.

After completion of the first time reading-out of the reset level, the intermediate voltage Vmin0 is applied to the gate electrode of the transfer transistor 22 for the period (2) of time. The application of the intermediate voltage Vmin0 results in that the charges (Qpd−Qmid0) are transferred to the floating diffusion capacitor 26 with partial charges Qmid0 of the accumulated charges Qpd in the photoelectric conversion element 21 being left as they are.

Next, for the period (3) of time, the OFF voltage is applied to the gate electrode of the transfer transistor 22. As a result, a signal corresponding to the charges (Qpd−Qmid0) transferred to the floating diffusion capacitor 26 is read out in the form of a signal having a first signal level to the vertical signal line 111.

Next, for the period (4) of time, the second time reset pulse RST is applied to the gate electrode of the reset transistor 23, thereby resetting the floating diffusion capacitor 26. Next, for the period (5) of time, a signal having the resulting reset level is read out in the form of a signal having a second time reset level to the vertical signal line 111.

Next, for the period (6) of time, the intermediate voltage Vmid1 is applied to the gate electrode of the transfer transistor 22. The application of the intermediate voltage Vmid1 results in that the charges (Qpd−Qmid1) are transferred to the floating diffusion capacitor 26 with the partial charges Qmid1 of the charges Qmid0 remaining in the photoelectric conversion element 21 being left as they are.

Next, for the period (7) of time, the OFF voltage Voff is applied to the gate electrode of the transfer transistor 22. As a result, a signal corresponding to the charges (Qpd0−Qmid1) transferred to the floating diffusion capacitor 26 is read out in the form of a signal having a second time signal level to the vertical signal line 111.

Next, for the period (8) of time, a third time reset pulse RST is applied to the gate electrode of the reset transistor 23, thereby resetting the floating diffusion capacitor 26. Next, for the period (9) of time, a signal having the resulting reset level is read out in the form of a signal having a third time reset level to the vertical signal line 111.

Next, for the period (10) of time, the ON voltage Von is applied to the gate electrode of the transfer transistor 22. The application of the ON voltage Von results in that the remaining charges Qmid1 in the photoelectric conversion element 21 are transferred to the floating diffusion capacitor 26.

Next, for the period (11) of time, the OFF voltage Voff is applied to the gate electrode of the transfer transistor 22. As a result, a signal corresponding to the charges Qmid1 transferred to the floating diffusion capacitor 26 is read out in the form of a signal having a third time signal level to the vertical signal line 111.

In the case of the tri-partition transfer, each of the intermediate voltages Vmid0 and Vmid1 becomes a first control signal, and the ON voltage Von becomes a second control signal.

<n-Partition Transfer>

Although in this case, the description has been given so far by giving the case of the tri-partition transfer as an example, the number of partitions for the transfer operation can be arbitrarily set. Also, when n-partition transfer (n: integral number of 2 or more) is carried out, as shown in FIG. 29, the (n−1) intermediate voltages Vmid0, Vmid1, . . . , Vmid(n−2), and the ON voltage Von have to be applied in order from the supplied-voltage controlling circuit 13 to the gate electrode of the transfer transistor 22, thereby driving the transfer transistor 22 concerned.

In the case of the n-partition transfer, each of the (n−1) intermediate voltages Vmid0 to Vmid(n−2) becomes a first control voltage, and the ON voltage Von becomes a second voltage.

The transfer of the charges, the reset, and the pixel selection are carried out every pixel row under the driving based on the n-partition transfer described above. As a result, the signal having the reset level and the signal having the signal level (that is, the output signals from the unit pixel 20) are read out in column-parallel, that is, in parallel in units of pixel columns from the unit pixel 20 to the vertical signal line 111 to be supplied to the column circuit 34 through the vertical signal line 111 concerned.

When the driving method based on the partition basis transfer corresponds to a system for applying the intermediate voltages Vmid0 and Vmid1 in order to the gate electrode of the transfer transistor 22 to transfer the charges in units of the arbitrary quantities of charges on the partition transfer basis, contrary to the case of the driving method based on the partition basis transfer of the first and second embodiments, the charge transfer and output are firstly made in the pixel having a high luminance, while none of the charge transfer and output is firstly made in the pixel having a low luminance.

In the case of the driving method based on the partition basis transfer shown in FIG. 28, as shown in FIG. 27, the partition basis transfer is carried out by utilizing the fact that the quantity of charges able to be held in the photoelectric conversion unit (light receiving unit) differs depending on the driving voltage for the transfer transistor 22. For example, in the example shown in FIG. 27, by using each of the intermediate voltages Vmid0 and Vmid1 as the driving voltage for the transfer transistor 22, the charges Qmid0 and Qmid1 can be held in order in the photoelectric conversion unit, and the charges exceeding in quality the charges Qmid0 and Qmid1 in order can be successively transferred to be read out.

<Feature of this Embodiment>

The feature of the CMOS image sensor 10C adopting the configuration that as has been described so far, the intermediate voltages Vmid0 and Vmid1, and the ON voltage Von are successively supplied in this order as the transfer pulse TRG to the gate electrode of the transfer transistor 22, the signal charges accumulated in the photoelectric conversion unit for the accumulation period of time of one unit are transferred, for example, on the tri-partition transfer basis to the floating diffusion capacitor 26, and the signal charges thus transferred on the tri-partition transfer basis are read out is as follows. That is to say, when the output equal to or larger than the maximum value in corresponding one of the partition basis transfer operations, the results read out before the partition basis transfer operation concerned or the addition results thereof are reset, and the subsequent addition processing or A/D conversion processing after that time is started to be executed.

<Effect of this Embodiment>

In each of the first and second embodiments, when the signal level is equal to or higher than the reference level, the addition processing or the A/D conversion processing is executed, and when the signal level becomes lower than the reference level, all the accumulated charges in the photoelectric conversion unit are read out. Thus, the subsequent addition processing or A/D conversion processing after that time is stopped. On the other hand, in this embodiment, the charges are accumulated in the photoelectric conversion unit from the state in which there is no charge accumulated therein. Also, when the signal level becomes equal to or higher than the reference level, the results read out before that time, or the addition results thereof are reset and the subsequent addition processing or A/D conversion processing after that time is started to be executed. As a result, the same operation and effect as those in the case of each of the first and second embodiments can be obtained without adding the noise components especially in the phase of the low luminance because there is no output in the reading-out operation in that phase.

Figure 30A:
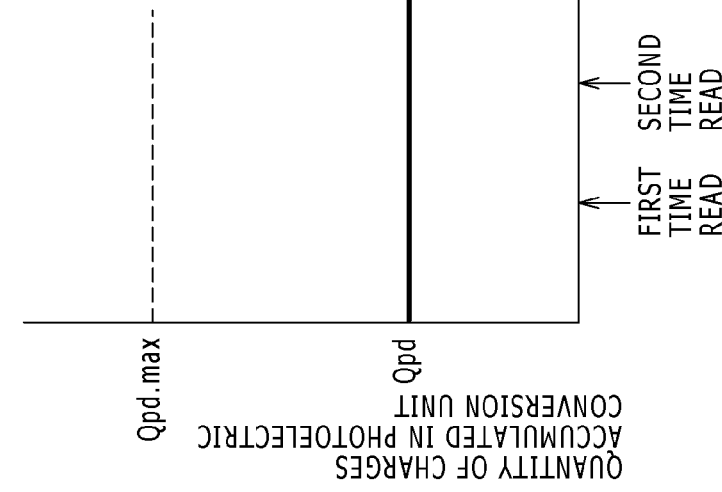
FIGS. 30A and 30B are respectively diagrams each showing a relationship between a maximum quantity, Qpd.max, of charges accumulated which a photoelectric conversion unit can treat, and maximum values Qfd.max in respective partition transfer operations.
Figure 30B:
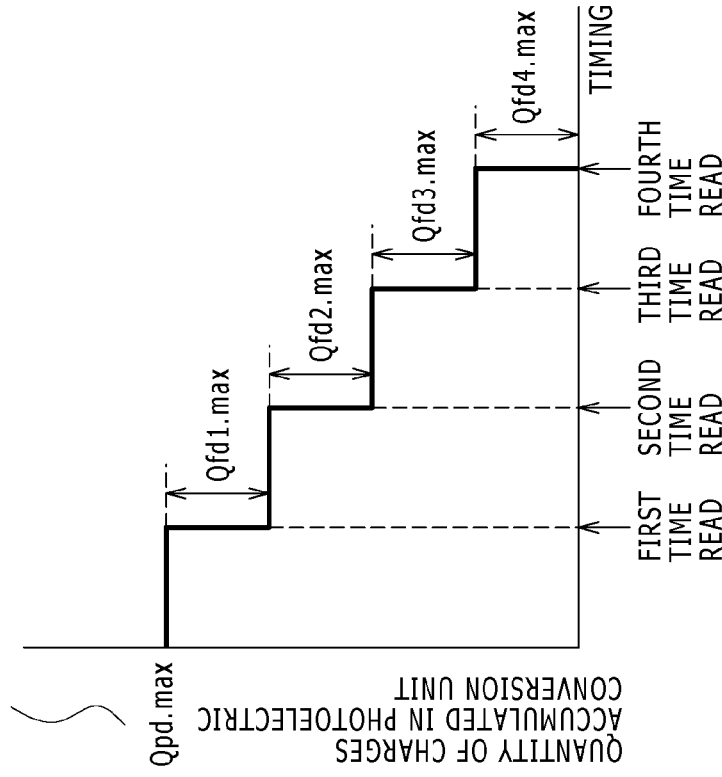

For example, a maximum quantity of charges able to be transferred is determined as shown in FIG. 30A. Also, as shown in FIG. 30B, for example, when the quantity of charges accumulated fulfills a relationship of $Qpd>Qfd4.max$, and $Qpd<Qfd4.max+Qfd3s.max$, the accumulated charges having the quantity Qpd are transferred to be outputted in none of the first time reading-out operation and the second time reading-out operation. Also, the charges having the quantity Qfd3 ($=Qpd-Qfd4.max$) are transferred to be read out in the third time reading-out operation, and the charges having the quantity Qfd4.max are transferred to be read out in the fourth time reading-out operation.

Also, addition of the output signals which are outputted in the third time reading-out operation and in the fourth time reading-out operation, respectively, results in all the accumulated charges having the quantity Qpd being obtained. In this case, a held-data reset signal is generated in accordance with the level determination of $Qfd3<Qfd3.max$ in the third time reading-out operation. Thus, the first time data and the second time data which are obtained through the A/D conversion to be held until that time, or the data obtained by adding the first time data and the second time data to be held is reset. Also, addition of only the third time data and the fourth time data makes it possible to suppress the noise components.

Hereinafter, a description will be given with respect to concrete Example of the column circuit 34 for carrying out the control in accordance with which when the output larger than the maximum value in corresponding one of the partition basis transfer operations, the results read out before the partition basis transfer operation concerned or the addition results thereof are reset, and the subsequent addition processing or A/D conversion processing after that time is started to be executed.

(Column Circuit)

Figure 31:
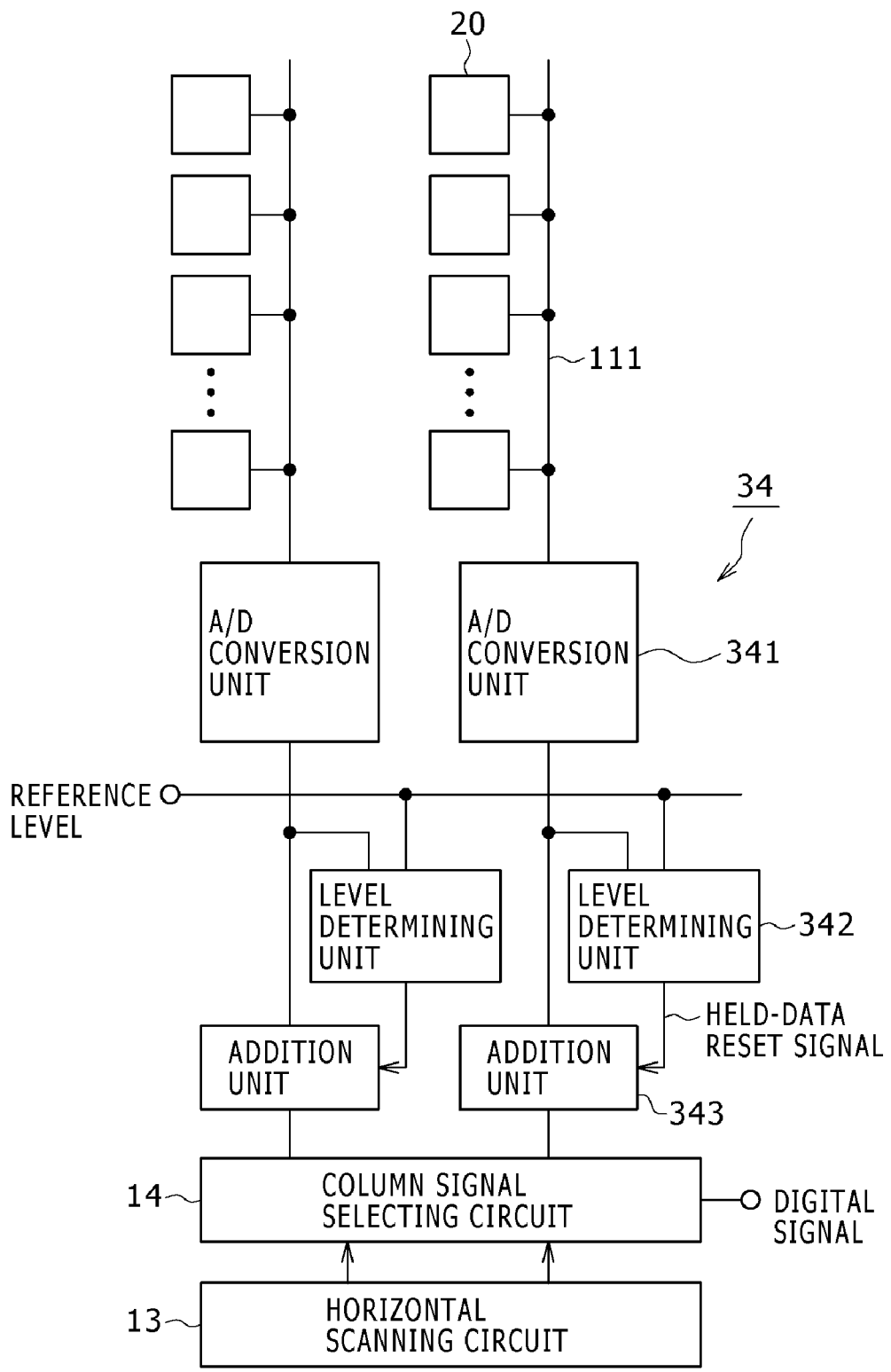
FIG. 31 is a block diagram showing an example of a configuration of a column circuit shown in FIG. 24.

FIG. 31 is a block diagram showing an example of a configuration of the column circuit 34. As shown in FIG. 31, the column circuit 34 is composed of an A/D conversion unit 341, a level determining unit 342 and an addition unit 343

The A/D conversion unit 341 converts an analog output signal transferred on the partition transfer basis from the unit pixel 20 of the pixel array unit 11 through the vertical signal line 111 into a digital signal. The level determining unit 342 compares a digital value of the digital signal obtained through the A/D conversion in the A/D conversion unit 341 with a reference level. When the digital level is determined to be higher than the reference level, the level determining unit 342 outputs a determination result, and supplies the determination result in the form of the held-data reset signal to the addition unit 343.

The addition unit 343 adds the digital signals which are successively supplied from the A/D conversion unit 341 along with the partition basic transfer to hold therein the addition result. When the held-data reset signal is supplied to the level determining unit 342, the addition unit 343 resets the held data which has been held therein after completion of the addition processing until that time, starts the addition processing again for the digital signals successively supplied from the A/D conversion unit 341 along with the partition basis transfer, and outputs the final held data as the pixel signal of one pixel.

When the determination result obtained from the level determining unit 342 is used as the held-data reset signal, the reset of the held data has to be performed once. Therefore, the level determining unit 342 may not have the configuration for continuing to hold the held-data reset signal as with the level determining unit 153 shown in FIG. 15.

It is noted that although an illustration is omitted here, a configuration can also be adopted such that a noise removing unit corresponding to the noise removing unit 151 shown in FIG. 10 is provided on a side of a preceding stage of the A/D conversion unit 341.

In the column circuit 34 of Example described above, the addition unit 343 has also a function as a control section for executing the addition processing for the output signals, having the signal levels each being equal to or higher than the reference level, of a plurality of output signals read out from the unit pixel 20 on the partition transfer basis in accordance with the determination result obtained from the level determining section 34, specifically, when each of the signal levels of a plurality of output signals becomes equal to or higher than the reference level, resetting the output signals read out before that time, or the addition result thereof to start the addition processing.

[High Conversion Efficiency]

In each of the CMOS image sensors 10A to 10C of the first to third embodiments described above, in order to enhance the charge-to-voltage conversion efficiency in the floating diffusion capacitor 26, the parasitic capacitance (FD capacitance) parasitic on the floating diffusion capacitor (charge-to-voltage conversion unit) 26 to which the signal charges are transferred from the photoelectric conversion element 21 is made minute, specifically, the parasitic capacitance is reduced so that the maximum quantity of charges treated by the floating diffusion capacitor 26 becomes smaller than the maximum quantity of charges able to be accumulated in the photoelectric conversion element 21, thereby making it possible to obtain the higher charge-to-voltage conversion efficiency.

Figure 32:
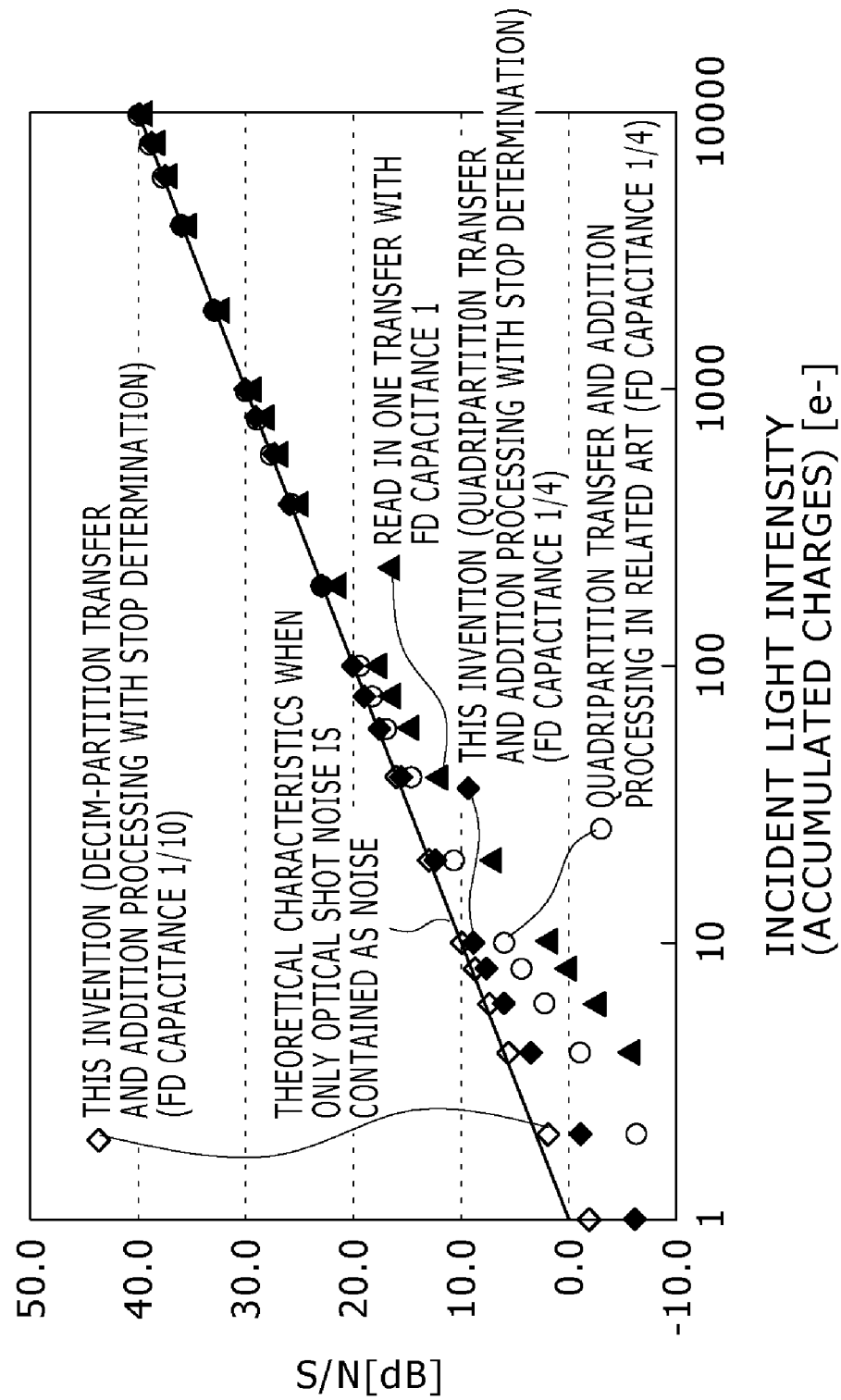
FIG. 32 is a graph showing a relationship between characteristics of an intensity of an incident light vs. an S/N ratio when a charge-to-voltage conversion efficiency is enhanced of the present invention, and those of a comparative example in a related art.

When the maximum quantity of charges accumulated in the photoelectric conversion element 21 is set as 10,000 $e^-$, the FD capacitance with which all the accumulated charges can be read out in one transferring operation is set as 1. FIG. 32 shows a relationship of the accumulated charges vs. the S/N ratio (dB) when the random noise in the reading-out operation in this case is set as 7 $e^-$, the fixed pattern noise in the reading-out operation is set as 2 $e^-$, and the optical shot noise is set as the square root of the optical shot noise.

FIG. 32 also shows the case where the quadri-transfer and the addition processing are executed under the stop determination of the present invention in comparison with the case where the partition transfer and the addition processing in the related art with the FD capacitance being set as ¼ under the same conditions.

As apparent from FIG. 32, it is understood that since after the high conversion efficiency, the noise components other than the optical shot noise are relatively reduced and all the accumulated charges are read out on the partition transfer basis, only the noise components can be prevented from being added in the case of the low luminance, the high image quantity can be realized.

In addition, as in the case where decim-partition is performed with the FD capacitance being similarly set as 1/10 and the addition processing of the present invention is executed, the FD capacitance is made minute and the number of partitions in the partition basis transfer is increased, thereby making it possible to reduce the noise components other than the optical shot noise.

As has been described so far, in the CMOS image sensors 10A to 10C in each of which the charge-to-voltage conversion efficiency is enhanced by, for example, reducing the parasitic capacitance parasitic on the floating diffusion capacitor 26 to relatively reduce the random noises and the fixed pattern noises against the signal level of the output signal and to improve the charge-to-voltage conversion efficiency, thereby transferring the accumulated charges, unable to be read out in one reading-out operation, on the partition transfer basis, when the signals outputted from the unit pixel 20 on the partition transfer basis are added to one another, the reading-out operation unnecessary for the addition processing is detected based either on the luminance of the incident light or on the accumulated charges to prevent the corresponding signals from being added to one another. As a result, the unnecessary random noises and fixed pattern noises can be prevented from being contained in the addition result. Consequently, the high S/N ratio can be realized especially in the low-luminance region.

[Modifications]

Although in each of the first to third embodiments, the description has been given so far by giving, as an example, the case where each of the signal processing circuit 15 (15A, 15B, 15C, 15D and 15E), and the column circuit 17 (17A, 17B and 17C), and 34 has the A/D conversion function, the A/D conversion function is not the essential constituent element. Thus, the expected object can be attained as long as each of the signal processing circuit 15, and the column circuits 17 and 34 has at least the addition function.

In addition, although in each of the first to third embodiments, the description has been given so far by giving, as an example, the case where the present invention is applied to the CMOS image sensor including the unit pixel 20 having the configuration that the charges in the photoelectric conversion element 21 are transferred to the common floating diffusion capacitor 26 on the partition transfer basis by one transfer transistor 22, and are successively read out to the common vertical signal line 111, the present invention is by no means limited thereto, and various changes can be made.

(Modification 1)

Figure 33:
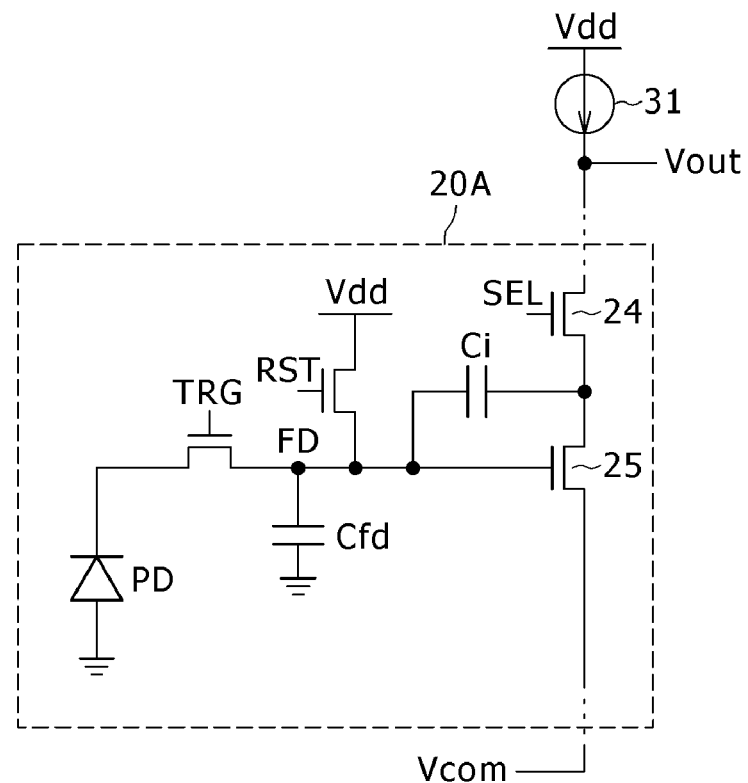
FIG. 33 is a circuit diagram showing a pixel circuit of a unit pixel of Modification 1.

FIG. 33 is a circuit diagram showing a pixel circuit of a unit pixel 20A of Modification 1. In the figure, units equal to those previously described with reference to FIG. 2 are designated by the same reference numerals, respectively.

As shown in FIG. 33, the unit pixel 20A of Modification 1 is configured such that a current source 31 is connected between the drain electrode of the selection transistor 25 connected in series with the amplification transistor 24, and the power source, and the output signal Vout is derived from the drain node of the selection transistor 25.

In the unit pixel 20A, the charge-to-voltage conversion efficiency in the floating diffusion capacitor 26 depends on the capacitance value Ci of the parasitic capacitance between the floating diffusion capacitor 26 and the vertical signal line 111. Thus, the capacitance value Ci of the parasitic capacitance is made smaller than the capacitance value Cfd of the floating diffusion capacitor 26, thereby making it possible to enhance the charge-to-voltage conversion efficiency.

Here, obtaining the effect of the high charge-to-voltage conversion efficiency is conditional on a relationship of Qi.max<Qfd.max where Qfd.max is the maximum quantity of charges accumulated in the floating diffusion capacitor 26, and Qi.max is the maximum quantity of charges accumulated in the parasitic capacitance Ci. For this reason, the charges, having the quantity Qpd, accumulated in the photoelectric conversion element 21 must be transferred on the partition transfer basis with the maximum quantity, Qi.max, of charges accumulated less than the maximum quantity, Qfd.max, of charges accumulated as a unit.

As has been described so far, the CMOS image sensor including the unit pixel 20A having the high charge-to-voltage conversion efficiency or the high voltage amplification factor is advantageous in the S/N ratio, while there may be a limit to the quantity of charges able to be read out in one reading-out operation.

The partition transfer previously described is applied to the CMOS image sensor including the unit pixel 20A, so that the charges in the photoelectric conversion element 21 are transferred on the partition transfer basis, which results in that all the charges generated in the photoelectric conversion element 21 can be efficiently outputted depending on the output range of the reading-out circuit.

In addition, in the unit pixel 20A of Modification 1 shown in FIG. 33, the voltage of the charge-to-voltage conversion unit (the floating diffusion capacitor 26) in the phase of the reset must be set at an operating point of the reading-out circuit. However, application of the partition basis transfer previously stated makes it possible to control the quantity of charges transferred on the partition transfer basis without depending on the potential of the charge-to-voltage conversion unit.

(Modification 2)

Figure 34:
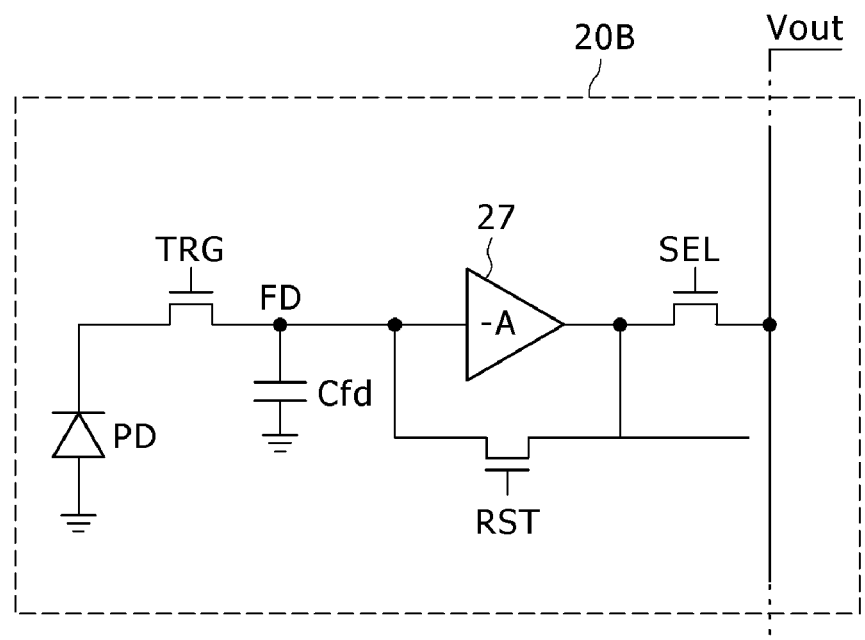
FIG. 34 is a circuit diagram showing a pixel circuit of a unit pixel of Modification 2.

FIG. 34 is a circuit diagram showing a pixel circuit of a unit pixel 20B of Modification 2. In the figure, units equal to those previously described with reference to FIG. 2 are designated by the same reference numerals, respectively.

As shown in FIG. 34, the unit pixel 20B of Modification 2 is configured such that an inverting amplification circuit 27 is connected between the floating diffusion capacitor 26 and the selection transistor 25 instead of using the amplification transistor 24, and the reset transistor 23 is connected in parallel with the inverting amplification circuit 27. Providing the inverting amplification circuit 27 inside the pixel in such a manner results in that the signal level can be amplified to improve the S/N ratio.

In the CMOS image sensor including the unit pixel 20C having the inverting amplification circuit 27 provided inside the pixel in such a manner, when an amplification factor of the inverting amplification circuit 27 is set as $-A$, an amplitude, $-A \cdot Qfd.max/Cfd$, of the output voltage Vout when the accumulated charges, having the maximum quantity, Qfd.max, are transferred to the floating diffusion capacitor 26 exceed an outputable range $\Delta$Vout.pp of the output Vout in some cases.

In this case, in order to output all the charges in the form of the output signals, the partition basis transfer must be carried out in units of the quantity of charges in which a quantity, Qmid ($<$Qfd.max), of charges less than the maximum quantity, Qfd.max, of charges accumulated in the floating diffusion capacitor 26 is set as being maximum.

The partition basis transfer previously stated is applied to the CMOS image sensor including the unit pixel 20B, and the charges in the photoelectric conversion element 21 are transferred on the arbitrary partition transfer basis, which results in that all the charges generated in the photoelectric conversion element 21 can be efficiently outputted in correspondence to the outputable range $\Delta$Vout.pp of the output voltage Vout.

Note that, in each of the first to third embodiments described above, the description has been given so far by giving, as an example, the case where the present invention is applied to the CMOS image sensor in which the unit pixels each serving to detect the signal charges corresponding to a quantity of visible light in the form of a physical quantity are arranged in matrix. However, the present invention is by no means limited to the application to the CMOS image sensor. That is to say, the present invention can also be applied to the general solid-state imaging devices each using the column system in which the column circuit is arranged every pixel column of the pixel array unit.

In addition, the present invention is by no means limited to the application to the imaging device for detecting a distribution of a quantity of incident visible light to capture the distribution thereof in the form of an image. That is to say, the present invention can also be applied to all the solid-state imaging device for detecting a distribution of a quantity of incident infrared rays, X-rays, particles or the like to capture the distribution thereof in the form of an image, and the solid-state imaging device (physical quantity distribution detecting device), such as a fingerprint detecting sensor, for detecting a distribution of other physical quantity such as a pressure or an electrostatic capacitance in a broad sense to capture the distribution thereof in the form of an image.

Moreover, the present invention is by no means limited to the solid-state imaging device for reading out the pixel signals from the respective unit pixels by successively scanning the unit pixels of the pixel array unit in units of rows. That is to say, the present invention can also be applied to an X-Y address type solid-state imaging device for selecting arbitrary pixels in units of pixels, and reading out the signals from the respective pixels thus selected in units of pixels.

It is noted that the solid-state imaging device may have a form of being formed as one chip, or may have a module form, having an imaging function, in which an imaging unit, and a signal processing unit or an optical system are collectively packed.

In addition, the present invention can be applied not only to the solid-state imaging device, but also to an imaging apparatus. Here, the imaging apparatus means a camera system such as a digital still camera or a video camera, or an electronic apparatus, having an imaging function, such as a mobile phone. It is noted that the imaging apparatus also means the above module form mounted to the electronic apparatus, that is, a camera module in some cases.

[Imaging Apparatus]

Figure 35:
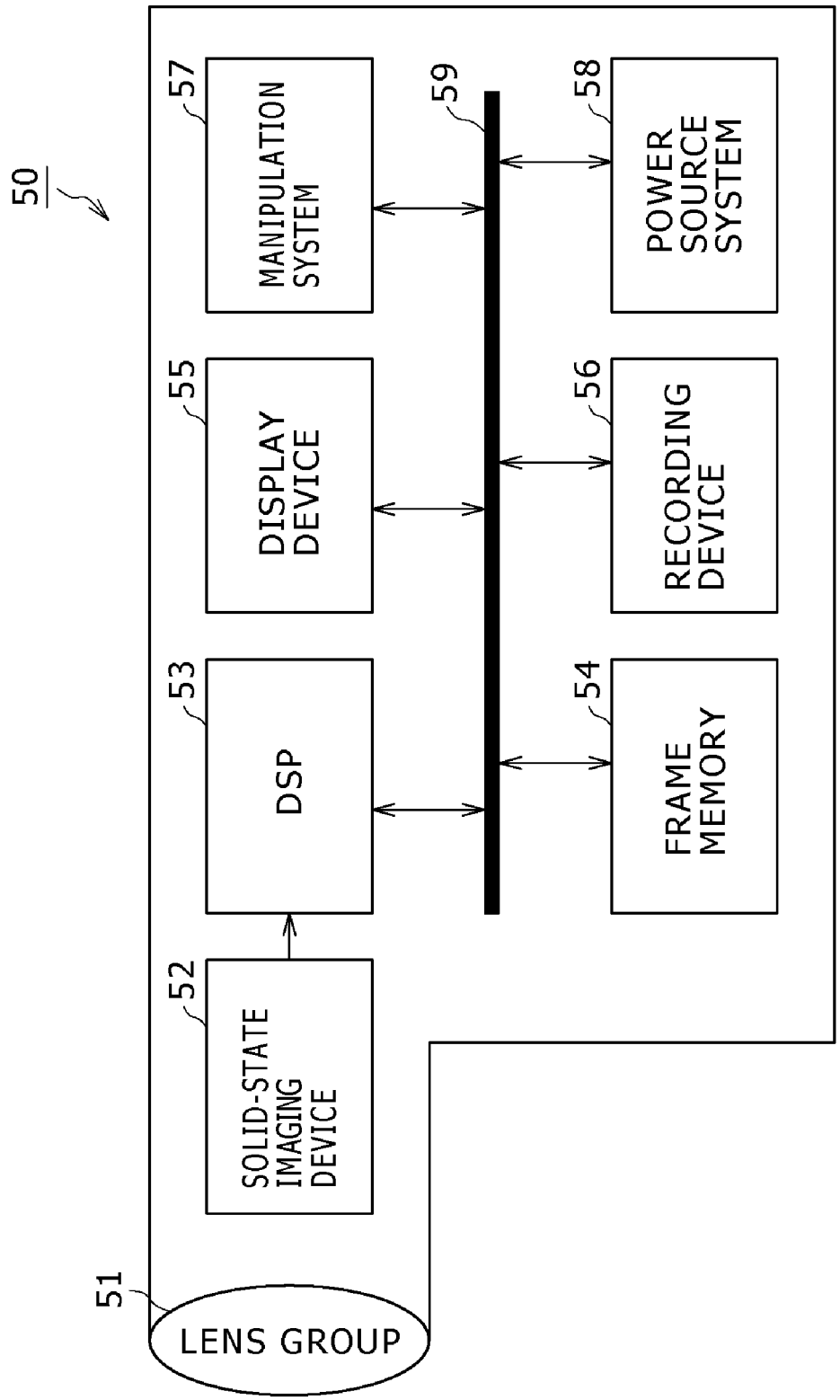
FIG. 35 is a block diagram showing a configuration of an imaging apparatus according to an embodiment of the present invention.
Figure 36:
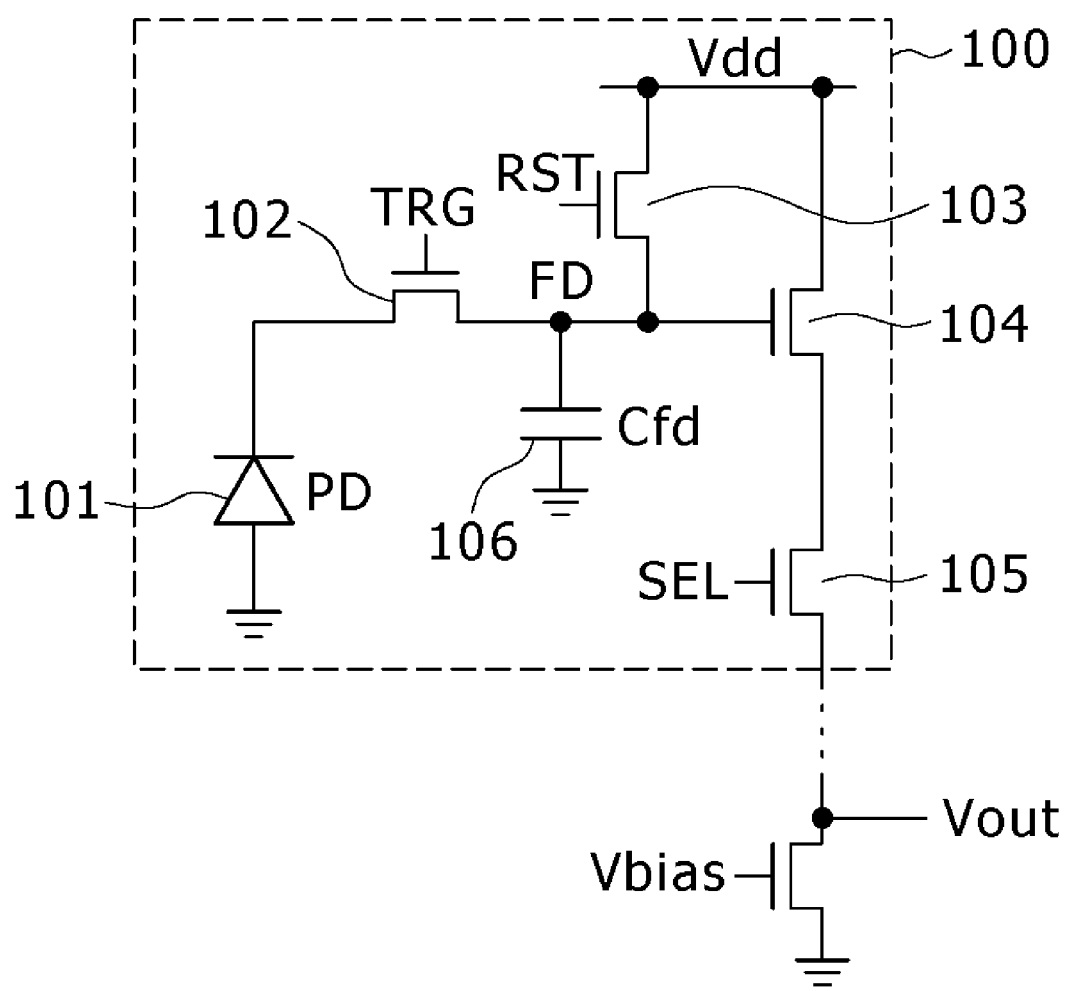
FIG. 36 is a circuit diagram showing an example of a configuration of a unit pixel in the related art.

FIG. 35 is a block diagram showing a configuration of an imaging apparatus according to an embodiment of the present invention. As shown in FIG. 35, the imaging apparatus 50 according to the embodiment of the present invention includes an optical system having a lens group 51, a solid-state imaging device 52, a DSP circuit 53 as a camera signal processing circuit, a frame memory 54, a display device 55, a recording device 56, a manipulation system 57, a power source system 58, and the like. Also, the DSP circuit 53, the frame memory 54, the display device 55, the recording device 56, the manipulation system 57, and the power source system 58 are connected to one another through a bus line 59.

The lens group 51 captures an incident light (image light) from a subject to focus the incident light onto an imaging area of the solid-state imaging device 52. The solid-state imaging device 52 converts a quantity of incident light focused onto the imaging area by the lens group 51 into electrical signals in units of pixels and outputs the electrical signals in the form of pixel signals. The CMOS image sensor 10 of each of the first to third embodiments described above is used as the solid-state imaging device 52.

The display device 55 is constituted by a panel type display device such as a liquid crystal display device or an organic electro luminescence (EL) display device. The display device 55 displays thereon a moving image or a still image captured by the solid-state imaging device 52. The recording device 56 records image data on the moving image or the still image captured by the solid-state imaging device 52 in a recording medium such as a video tape or a digital versatile disk (DVD).

The manipulation system 57 issues manipulation commands about the various functions which the imaging apparatus of this embodiment has under the manipulation made by a user. The power source system 58 suitably supplies the various power sources becoming the operation power sources for the DSP circuit 53, the frame memory 54, the display device 55, the recording device 56, and the manipulation system 57 to those objects of power supply, respectively.

As has been described so far, in the imaging apparatus, such as the camera module, for the video camera or the digital still camera, or the mobile apparatus such as the mobile phone, any one of the CMOS image sensors 10A to 10C of the first to third embodiments described above is used as the solid-state imaging device 52 thereof, which results in that the charges are transferred on the partition transfer basis when all the accumulated charges can not be outputted in one reading-out operation, and the unnecessary random noises and fixed pattern noises can be prevented from being contained in the addition result when the output signals transferred on the partition transfer basis are added to one another. Consequently, the high S/N ratio can be realized especially in the low luminance region.

It should be understood by those skilled in the art that various modifications, combinations, sub-combinations and alterations may occur depending on design requirements and other factors insofar as they are within the scope of the appended claims or the equivalents thereof.

What is claimed is:

1. A solid-state imaging device, comprising:
    a pixel array unit constituted by arranging unit pixels in matrix, each of said unit pixels including a photoelectric conversion unit configured to convert an optical signal into signal charges, a transfer element configured to transfer the signal charges obtained through photoelectric conversion in said photoelectric conversion unit, and output means configured to output the signal charges transferred by said transfer element;
    driving means configured to read out the signal charges accumulated in said photoelectric conversion unit for an accumulation period of time of one unit and transferred at least in two batches by said transfer element through said output means;
    signal processing means configured to execute addition processing for a plurality of output signals read out on a partition basis from said unit pixel;
    level determining means configured to compare each of signal levels of the plurality of output signals with a reference level; and
    control means configured to instruct said signal processing means to execute the addition processing for the output signals, having the signal levels each being equal to or higher than the reference level, of the plurality of output signals in accordance with a determination result obtained from said level determining means.

2. The solid-state imaging device according to claim 1, wherein when each of the signal levels of the plurality of output signals is lower than the reference level, said control means instructs said signal processing means to stop the addition processing.

3. The solid-state imaging device according to claim 2, wherein when each of the signal levels of the plurality of output signals is lower than the reference level, said control means instructs said signal processing means to stop the addition processing for the subsequent output signals in and after that time transferred on the partition transfer basis in said output means.

4. The solid-state imaging device according to claim 1, wherein when each of the signal levels of the plurality of output signals is equal to or higher than the reference level, said control means instructs said signal processing means to start the addition processing.

5. The solid-state imaging device according to claim 4, wherein when each of the signal levels of the plurality of output signals is equal to or higher than the reference level, said control means resets the output signals read out in and before that time or an addition result thereof.

6. The solid-state imaging device according to claim 1, wherein said signal processing means includes analog-to-digital conversion means for executing analog-to-digital conversion processing for the plurality of output signals.

7. The solid-state imaging device according to claim 6, wherein when each of the signal levels of the plurality of output signals is lower than the reference level, said control means instructs said signal processing means to stop the analog-to-digital conversion processing.

8. The solid-state imaging device according to claim 6, wherein when each of the signal levels of the plurality of output signals is equal to or higher than the reference level, said control means instructs said signal processing means to start the analog-to-digital conversion processing.

9. The solid-state imaging device according to claim 6, wherein said analog-to-digital conversion means includes:
    comparing means configured to compare each of the plurality of signals with a reference signal; and
    counting means configured to carry out an operation for performing counting by a count value corresponding to a comparison result obtained from said comparing means.

10. The solid-state imaging device according to claim 9, wherein said analog-to-digital conversion means executes the analog-to-digital conversion processing and the addition processing in parallel in accordance with the counting operation by said counting means.

11. The solid-state imaging device according to claim 9, wherein said counting means carries out up-count or down-count by the count value corresponding to the comparison result obtained from said comparing means.

12. The solid-state imaging device according to claim 11, wherein said analog-to-digital conversion means obtains a difference between a reset level and the signal level obtained from said unit pixel in accordance with the up-count or the down-count by said counting means.

13. The solid-state imaging device according to claim 1, wherein said output means includes a charge-to-voltage conversion unit configured to convert the signal charges transferred by said transfer element into a voltage, and a parasitic capacitance is set as being small so that a maximum quantity of charges transferred by said charge-to-voltage conversion unit is less than a maximum quantity of charges accumulable in said photoelectric conversion unit.

14. A signal processing method for a solid-state imaging device comprising:
    a pixel array unit constituted by arranging unit pixels in matrix, each of said unit pixels including a photoelectric conversion unit configured to convert an optical signal into signal charges, a transfer element configured to transfer the signal charges obtained through photoelectric conversion in said photoelectric conversion unit, and an output section configured to output the signal charges transferred by said transfer element;
    driving means configured to read out the signal charges accumulated in said photoelectric conversion unit for an accumulation period of time of one unit and transferred at least in two batches by said transfer element through said output section;
    said solid-state imaging device executing addition processing for a plurality of output signals read out on a partition basis from said unit pixel;
    said signal processing method including the steps of:
    comparing each of the signal levels of the plurality of output signals with a reference level; and
    executing the addition processing for the output signals, having the signal levels each being equal or higher than the reference level, of the plurality of output signals in accordance with a comparison result.

15. The signal processing method for a solid-state imaging device according to claim 14, wherein when each of the signal levels of the plurality of output signals is lower than the reference level, the addition processing is stopped.

16. The signal processing method for a solid-state imaging device according to claim 14, wherein when each of the signal levels of the plurality of output signals is equal to or higher than the reference level, the addition processing is started.

17. An imaging apparatus, comprising:

a solid-state imaging device constituted by arranging unit pixels in matrix, each of said unit pixels including a photoelectric conversion unit configured to convert an optical signal into signal charges, a transfer element configured to transfer the signal charges obtained through photoelectric conversion in said photoelectric conversion unit, and output means configured to output the signal charges transferred by said transfer element; and an optical system configured to focus an incident light onto an imaging area of said solid-state imaging device;

wherein said solid-state imaging device includes:

driving means configured to read out the signal charges accumulated in said photoelectric conversion unit for an accumulation period of time of one unit and transferred at least in two batches by said transfer element through said output means;

signal processing means configured to execute addition processing for a plurality of output signals read out on a partition basis from said unit pixel;

level determining means configured to compare each of signal levels of the plurality of output signals with a reference level; and control means configured to instruct said signal processing means to execute the addition processing for the output signals, having the signal levels each being equal to or higher than the reference level, of the plurality of output signals in accordance with a determination result obtained from said level determining means.

* * * * *